United States Patent
Koyama et al.

(10) Patent No.: US 10,585,500 B2
(45) Date of Patent: *Mar. 10, 2020

(54) INPUT DISPLAY DEVICE AND INPUT DISPLAY METHOD

(71) Applicant: Sharp Kabushiki Kaisha, Sakai, Osaka (JP)

(72) Inventors: Noriyuki Koyama, Sakai (JP); Satoshi Terada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/441,050

(22) Filed: Jun. 14, 2019

(65) Prior Publication Data

US 2019/0294268 A1    Sep. 26, 2019

Related U.S. Application Data

(63) Continuation of application No. 15/497,325, filed on Apr. 26, 2017, now Pat. No. 10,359,864.

(30) Foreign Application Priority Data

Apr. 27, 2016  (JP) ................................ 2016-089589
Mar. 8, 2017   (JP) ................................ 2017-044279

(51) Int. Cl.
  *G06F 3/0354*    (2013.01)
  *G06F 3/041*     (2006.01)
  *G06F 3/0488*    (2013.01)
  *G06F 17/24*     (2006.01)
  *G06K 9/00*      (2006.01)
  *G06K 9/22*      (2006.01)

(52) U.S. Cl.
  CPC ...... *G06F 3/03545* (2013.01); *G06F 3/03547* (2013.01); *G06F 3/0412* (2013.01);
  (Continued)

(58) Field of Classification Search
  CPC .... G06K 9/00416–00422; G06K 9/222; G06F 3/03545
  (Continued)

(56) References Cited

U.S. PATENT DOCUMENTS 6,049,329 A * 4/2000 Zetts ................... G06F 3/04883
                                                      178/18.01
6,456,740 B1 * 9/2002 Carini .................. G06K 9/2054
                                                      178/18.01
(Continued)

OTHER PUBLICATIONS

Koyama et al., "Input Display Device and Input Display Method", U.S. Appl. No. 15/497,325, filed Apr. 26, 2017.

*Primary Examiner* — Michael Pervan
(74) *Attorney, Agent, or Firm* — Keating & Bennett, LLP

(57) ABSTRACT

An input display device includes a display unit that displays a screen for handwriting input on an input screen including a plurality of input fields, a stroke data processing unit that groups stroke data which is input to a capture screen by handwriting into stroke data representing characters to generate grouped stroke data as grouping stroke data, a character recognition unit that conducts character recognition on the grouping stroke data to convert the grouping stroke data into at least one recognized character, and a control processing unit that displays the at least one recognized character at the plurality of input fields of the input screen correlated with positions, at which handwriting input was performed, in the screen for handwriting input.

10 Claims, 35 Drawing Sheets

(52) U.S. Cl.
CPC ........ G06F 3/04883 (2013.01); G06F 17/242 (2013.01); G06F 17/243 (2013.01); G06K 9/00 (2013.01); G06K 9/00416 (2013.01); G06K 9/00422 (2013.01); G06K 9/222 (2013.01)

(58) Field of Classification Search
USPC ................ 178/18.01–19.07; 345/173–179
See application file for complete search history.

(56) References Cited

U.S. PATENT DOCUMENTS

| | | | | |
|---|---|---|---|---|
| 6,525,716 | B1* | 2/2003 | Makino | G06F 3/04886 |
| | | | | 345/173 |
| 6,697,056 | B1* | 2/2004 | Bergelson | G06K 9/2054 |
| | | | | 345/178 |
| 6,703,570 | B1* | 3/2004 | Russell | G01S 5/18 |
| | | | | 178/18.01 |
| 7,564,995 | B1* | 7/2009 | Yaeger | G06F 3/038 |
| | | | | 382/119 |
| 2009/0078473 | A1* | 3/2009 | Overgard | G01S 5/00 |
| | | | | 178/18.01 |
| 2011/0320924 | A1* | 12/2011 | Ratan | G06F 3/03545 |
| | | | | 715/226 |
| 2012/0066578 | A1* | 3/2012 | Robin | G06F 3/03545 |
| | | | | 715/212 |
| 2012/0206374 | A1* | 8/2012 | Chen | G06F 3/03545 |
| | | | | 345/173 |
| 2015/0084901 | A1* | 3/2015 | Kim | G06F 3/04883 |
| | | | | 345/173 |
| 2016/0162174 | A1* | 6/2016 | Tsutsui | G06F 3/04883 |
| | | | | 345/173 |

\* cited by examiner

FIG. 13

REGISTRATION INFORMATION INPUT

● PLEASE ENTER CUSTOMER INFORMATION.

PLEASE ENTER FOLLOWING ITEMS AND PUSH "TO CONFIRMATION SCREEN" BUTTON.
PLEASE BE INFORMED THAT THERE IS LIMIT ON INPUT CHARACTER.
PLEASE CHECK WRITTEN CONTENTS OF EACH ITEM AND INPUT CUSTOMER INFORMATION.

Ⓐ CUSTOMER'S BASIC INFORMATION

PLEASE ENTER NAME.

| REQUIRED | NAME (FULL WIDTH CHARACTER) | (EXAMPLE) HAYAKAWA [ ] LAST NAME | (EXAMPLE) TARO [ ] FIRST NAME |
| | | (EXAMPLE) Hayakawa [ ] Last name | (EXAMPLE) Taro [ ] First name |

PLEASE ENTER YOUR BIRTHDAY USING A.D.

| REQUIRED | DATE OF BIRTH (HALF WIDTH CHARACTER) | A.D. [ ] YEAR [ ] MONTH [ ] DAY |

FIG. 14

| CONTENTS | COORDINATE | INFORMATION |
|---|---|---|
| INPUT FIELD SCREEN | (X0, Y0) (Xmax, Y0)<br>(X0, Ymax) (Xmax, Ymax) | |
| INPUT FIELD (LAST NAME) | (X2101, Y2101) (X2102, Y2101)<br>(X2101, Y2102) (X2102, Y2102) | |
| INPUT FIELD (FIRST NAME) | (X2121, Y2121) (X2122, Y2121)<br>(X2121, Y2122) (X2122, Y2122) | |
| INPUT FIELD (Last name) | (X2201, Y2201) (X2202, Y2201)<br>(X2201, Y2202) (X2202, Y2202) | KATAKANA LIMITED INFORMATION (FULL WIDTH CHARACTER) |
| INPUT FIELD (First name) | (X2221, Y2221) (X2222, Y2221)<br>(X2221, Y2222) (X2222, Y2222) | |
| INPUT FIELD (YEAR) | (X2301, Y2301) (X2302, Y2301)<br>(X2301, Y2302) (X2302, Y2302) | NUMERIC LIMITED INFORMATION (HALF WIDTH CHARACTER) |
| INPUT FIELD (MONTH) | (X2321, Y2321) (X2322, Y2321)<br>(X2321, Y2322) (X2322, Y2322) | |
| INPUT FIELD (DAY) | (X2341, Y2341) (X2342, Y2341)<br>(X2341, Y2342) (X2342, Y2342) | |

FIG. 15

REGISTRATION INFORMATION INPUT

● PLEASE ENTER CUSTOMER INFORMATION.

PLEASE ENTER FOLLOWING ITEMS AND PUSH "TO CONFIRMATION SCREEN" BUTTON.
PLEASE BE INFORMED THAT THERE IS LIMIT ON INPUT CHARACTER.
PLEASE CHECK WRITTEN CONTENTS OF EACH ITEM AND INPUT CUSTOMER INFORMATION.

Ⓐ CUSTOMER'S BASIC INFORMATION

PLEASE ENTER NAME.

| REQUIRED | NAME (FULL WIDTH CHARACTER) | LAST: (EXAMPLE) HAYAKAWA HATSUME | FIRST NAME: (EXAMPLE) Taro TARO |
| | | Last name (EXAMPLE) Hayakawa Hatsume | First name (EXAMPLE) Taro Taro |

PLEASE ENTER YOUR BIRTHDAY USING A.D.

| REQUIRED | DATE OF BIRTH (HALF WIDTH CHARACTER) | A.D. 2016 YEAR 7 MONTH 7 DAY |

FIG. 16

REGISTRATION INFORMATION INPUT

● PLEASE ENTER CUSTOMER INFORMATION.

PLEASE ENTER FOLLOWING ITEMS AND PUSH "TO CONFIRMATION SCREEN" BUTTON.
PLEASE BE INFORMED THAT THERE IS NO LIMIT ON INPUT CHARACTER.
PLEASE CHECK WRITTEN CONTENTS OF EACH ITEM AND INPUT CUSTOMER INFORMATION.

Ⓐ CUSTOMER'S BASIC INFORMATION

PLEASE ENTER NAME.

| REQUIRED | NAME (FULL WIDTH CHARACTER) | (EXAMPLE) HAYAKAWA HATSUMEI LAST NAME | (EXAMPLE) TARO TARO FIRST NAME |
| | | (EXAMPLE) Hayakawa Hatsumei Last name | (EXAMPLE) Taro Taro First name |

PLEASE ENTER YOUR BIRTHDAY USING A.D.

| REQUIRED | DATE OF BIRTH (HALF WIDTH CHARACTER) | A.D. 2016 YEAR | 1 MONTH | 1 DAY |

FIG. 17

REGISTRATION INFORMATION INPUT

● PLEASE ENTER CUSTOMER INFORMATION.

PLEASE ENTER FOLLOWING ITEMS AND PUSH "TO CONFIRMATION SCREEN" BUTTON.
PLEASE BE INFORMED THAT THERE IS LIMIT ON INPUT CHARACTER.
PLEASE CHECK WRITTEN CONTENTS OF EACH ITEM AND INPUT CUSTOMER INFORMATION.

Ⓐ CUSTOMER'S BASIC INFORMATION

PLEASE ENTER NAME.

| REQUIRED | NAME (FULL WIDTH CHARACTER) | (EXAMPLE) HAYAKAWA LAST NAME HATSUMEI | (EXAMPLE) TARO FIRST NAME TARO |
| | | (EXAMPLE) Hayakawa Last name Hatsumei | (EXAMPLE) Taro First name Taro |

PLEASE ENTER YOUR BIRTHDAY USING A.D.

| REQUIRED | DATE OF BIRTH (HALF WIDTH CHARACTER) | A.D. 2016 YEAR 1 MONTH 1 DAY |

FIG. 20

REGISTRATION INFORMATION INPUT

● PLEASE ENTER CUSTOMER INFORMATION.

PLEASE ENTER FOLLOWING ITEMS AND PUSH "TO CONFIRMATION SCREEN" BUTTON.
PLEASE BE INFORMED THAT THERE IS LIMIT ON INPUT CHARACTER.
PLEASE CHECK WRITTEN CONTENTS OF EACH ITEM AND INPUT CUSTOMER INFORMATION.

(A) CUSTOMER'S BASIC INFORMATION — 210

PLEASE ENTER NAME.

| [REQUIRED] | NAME (FULL WIDTH CHARACTER) | (EXAMPLE) HAYAKAWA [ LAST NAME ] | (EXAMPLE) TARO [ FIRST NAME ] — 212 |
| | | (EXAMPLE) Hayakawa [ Last name ] — 220 | (EXAMPLE) Taro [ First name ] — 222 |

PLEASE ENTER YOUR BIRTHDAY USING A.D.

| [REQUIRED] | DATE OF BIRTH (HALF WIDTH CHARACTER) | A.D. [ ] YEAR  [ ] MONTH  [ ] DAY |

(230, 232, 234)

PLEASE SPECIFY GENDER.

| [REQUIRED] | GENDER (SELECT ONE) | 240 ○ MALE    242 ○ FEMALE |

| CONTENTS | COORDINATE | INFORMATION |
|---|---|---|
| INPUT FIELD SCREEN | (X0, Y0) (Xmax, Y0)<br>(X0, Ymax) (Xmax, Ymax) | |
| INPUT FIELD (LAST NAME) | (X2101, Y2101) (X2102, Y2101)<br>(X2101, Y2102) (X2102, Y2102) | KATAKANA LIMITED INFORMATION (FULL WIDTH CHARACTER) |
| INPUT FIELD (FIRST NAME) | (X2121, Y2121) (X2122, Y2121)<br>(X2121, Y2122) (X2122, Y2122) | |
| INPUT FIELD (Last name) | (X2201, Y2201) (X2202, Y2201)<br>(X2201, Y2202) (X2202, Y2202) | |
| INPUT FIELD (First name) | (X2221, Y2221) (X2222, Y2221)<br>(X2221, Y2222) (X2222, Y2222) | |
| INPUT FIELD (YEAR) | (X2301, Y2301) (X2302, Y2301)<br>(X2301, Y2302) (X2302, Y2302) | NUMERIC LIMITED INFORMATION (HALF WIDTH CHARACTER) |
| INPUT FIELD (MONTH) | (X2321, Y2321) (X2322, Y2321)<br>(X2321, Y2322) (X2322, Y2322) | |
| INPUT FIELD (DAY) | (X2341, Y2341) (X2342, Y2341)<br>(X2341, Y2342) (X2342, Y2342) | |
| INPUT FIELD (CHECK) | (X2401, Y2401) (X2402, Y2401)<br>(X2401, Y2402) (X2402, Y2402) | CHECK MARK ATTRIBUTE INFORMATION (SELECTION) |
| INPUT FIELD (CHECK) | (X2421, Y2421) (X2422, Y2421)<br>(X2421, Y2422) (X2422, Y2422) | |

FIG. 22

REGISTRATION INFORMATION INPUT

● PLEASE ENTER CUSTOMER INFORMATION.

PLEASE ENTER FOLLOWING ITEMS AND PUSH "TO CONFIRMATION SCREEN" BUTTON.
PLEASE BE INFORMED THAT THERE IS NO LIMIT ON INPUT CHARACTER.
PLEASE CHECK WRITTEN CONTENTS OF EACH ITEM AND INPUT CUSTOMER INFORMATION.

Ⓐ CUSTOMER'S BASIC INFORMATION

PLEASE ENTER NAME.

| REQUIRED | NAME (FULL WIDTH CHARACTER) | LAST: HATSUMEI (EXAMPLE) HAYAKAWA | FIRST NAME: TARO (EXAMPLE) Taro |
| | | Last name: Hatsume (EXAMPLE) Hayakawa | First name: Taro (EXAMPLE) Taro |

PLEASE ENTER YOUR BIRTHDAY USING A.D.

| REQUIRED | DATE OF BIRTH (HALF WIDTH CHARACTER) | A.D. 2016 YEAR / MONTH / DAY |

PLEASE SPECIFY GENDER.

| REQUIRED | GENDER (SELECT ONE) | 240 ●MALE  242 ○FEMALE |

FIG. 23

REGISTRATION INFORMATION INPUT

● PLEASE ENTER CUSTOMER INFORMATION.

PLEASE ENTER FOLLOWING ITEMS AND PUSH "TO CONFIRMATION SCREEN" BUTTON.
PLEASE BE INFORMED THAT THERE IS LIMIT ON INPUT CHARACTER.
PLEASE CHECK WRITTEN CONTENTS OF EACH ITEM AND INPUT CUSTOMER INFORMATION.

Ⓐ CUSTOMER'S BASIC INFORMATION

PLEASE ENTER NAME.

REQUIRED | NAME (FULL WIDTH CHARACTER) | (EXAMPLE) HAYAKAWA HATSUMEI LAST NAME | (EXAMPLE) Hayakawa *Hatsumei* Last name | (EXAMPLE) TARO TARO FIRST NAME | (EXAMPLE) Taro *Taro* First name

PLEASE ENTER YOUR BIRTHDAY USING A.D.

REQUIRED | DATE OF BIRTH (HALF WIDTH CHARACTER) | A.D. 2016 YEAR 1 MONTH 1 DAY

PLEASE SPECIFY GENDER.

REQUIRED | GENDER (SELECT ONE) | ☑ MALE ○ FEMALE

FIG. 24

REGISTRATION INFORMATION INPUT — 200

● PLEASE ENTER CUSTOMER INFORMATION.

PLEASE ENTER FOLLOWING ITEMS AND PUSH "TO CONFIRMATION SCREEN" BUTTON.
PLEASE BE INFORMED THAT THERE IS LIMIT ON INPUT CHARACTER.
PLEASE CHECK WRITTEN CONTENTS OF EACH ITEM AND INPUT CUSTOMER INFORMATION.

Ⓐ CUSTOMER'S BASIC INFORMATION — 210

PLEASE ENTER NAME.

| REQUIRED | NAME (FULL WIDTH CHARACTER) | (EXAMPLE) HAYAKAWA LAST NAME [HATSUMEI] — 212 | (EXAMPLE) TARO FIRST NAME [TARO] |
| | | (EXAMPLE) Hayakawa Last name [Hatsumei] — 220 | (EXAMPLE) Taro First name [Taro] — 222 |

PLEASE ENTER YOUR BIRTHDAY USING A.D.

| REQUIRED | DATE OF BIRTH (HALF WIDTH CHARACTER) | A.D. [2016] YEAR [1] MONTH [1] DAY |

— 230, 232, 234

PLEASE SPECIFY GENDER.

| REQUIRED | GENDER (SELECT ONE) | 240 ⊙ MALE    242 ○ FEMALE |

FIG. 25

REGISTRATION INFORMATION INPUT
● PLEASE ENTER CUSTOMER INFORMATION.

PLEASE ENTER FOLLOWING ITEMS AND PUSH "TO CONFIRMATION SCREEN" BUTTON.
PLEASE BE INFORMED THAT THERE IS LIMIT ON INPUT CHARACTER.
PLEASE CHECK WRITTEN CONTENTS OF EACH ITEM AND INPUT CUSTOMER INFORMATION.

Ⓐ CUSTOMER'S BASIC INFORMATION

PLEASE ENTER NAME.

| REQUIRED | NAME (FULL WIDTH CHARACTER) | LAST: HATSUMEI (EXAMPLE) HAYAKAWA | FIRST NAME: TARO (EXAMPLE) Taro |
| | | Last name: Hatsume (Example) Hayakawa | First name: Taro (Example) Taro |

PLEASE ENTER YOUR BIRTHDAY USING A.D.

| REQUIRED | DATE OF BIRTH (HALF WIDTH CHARACTER) | A.D. 2016 YEAR / MONTH / DAY |

PLEASE SPECIFY GENDER.

| REQUIRED | GENDER (SELECT ONE) | ✓ MALE  ○ FEMALE |

HATSU (stamp) — 350

FIG. 26

REGISTRATION INFORMATION INPUT
● PLEASE ENTER CUSTOMER INFORMATION.

PLEASE ENTER FOLLOWING ITEMS AND PUSH "TO CONFIRMATION SCREEN" BUTTON.
PLEASE BE INFORMED THAT THERE IS LIMIT ON INPUT CHARACTER.
PLEASE CHECK WRITTEN CONTENTS OF EACH ITEM AND INPUT CUSTOMER INFORMATION.

(A) CUSTOMER'S BASIC INFORMATION

PLEASE ENTER NAME.

| REQUIRED | NAME (FULL WIDTH CHARACTER) | LAST (EXAMPLE) HAYAKAWA HATSUMEI | FIRST NAME (EXAMPLE) Taro TARO |
| | | Last name (EXAMPLE) Hayakawa Hatsumei | First name (EXAMPLE) Taro Taro |

PLEASE ENTER YOUR BIRTHDAY USING A.D.

| REQUIRED | DATE OF BIRTH (HALF WIDTH CHARACTER) | A.D. 2016 YEAR 1 MONTH 1 DAY |

PLEASE SPECIFY GENDER.

| REQUIRED | GENDER (SELECT ONE) | ☑ MALE  ○ FEMALE |

(HATSU) — 350

FIG. 27

REGISTRATION INFORMATION INPUT — 200

● PLEASE ENTER CUSTOMER INFORMATION.

PLEASE ENTER FOLLOWING ITEMS AND PUSH "TO CONFIRMATION SCREEN" BUTTON.
PLEASE BE INFORMED THAT THERE IS LIMIT ON INPUT CHARACTER.
PLEASE CHECK WRITTEN CONTENTS OF EACH ITEM AND INPUT CUSTOMER INFORMATION.

(HATSU) — 350

(A) CUSTOMER'S BASIC INFORMATION — 210

PLEASE ENTER NAME.

| REQUIRED | NAME (FULL WIDTH CHARACTER) | (EXAMPLE) HAYAKAWA LAST NAME [HATSUMEI] | (EXAMPLE) TARO FIRST NAME [TARO] — 212 |
| | | (EXAMPLE) Hayakawa Last name [Hatsumei] — 220 | (EXAMPLE) Taro First name [Taro] — 222 |

PLEASE ENTER YOUR BIRTHDAY USING A.D.

| REQUIRED | DATE OF BIRTH (HALF WIDTH CHARACTER) | A.D. [2016] YEAR [1] MONTH [1] DAY |

— 230, 232, 234

PLEASE SPECIFY GENDER.

| REQUIRED | GENDER (SELECT ONE) | 240 ⦿ MALE   242 ○ FEMALE |

FIG. 28

Please fill your personal information.

First name: John

Last name: Smith

Date of Birth: 8/29/1970

Title: ☑ Mr  ○ Ms

Please fill your personal information.

First name: John

Last name: Smith

Date of Birth: 8/29/1970

Title: ☑ Mr  ○ Ms

FIG. 31

Please fill your personal information.

First name: John
Last name: Smith
Date of Birth: 8/29/1990
Title: ☑ Mr  ○ Ms
Signature: *John Smith*

FIG. 32

Please fill your personal information.

First name: John
Last name: Smith
Date of Birth: 8/29/1970
Title: ☑ Mr  ◯ Ms
Signature: *John Smith*

510
610
612

NON-DISCLOSURE AGREEMENT

This Agreement is made and entered into . . . . . .
. . . . .

The Parties have caused their respective authorized representatives to sign this Agreement as of the Effective Date.

A Corporation

Name: John Smith

Title: Senior Vice President

Date: 12/15/2016

B Corporation

Name:

Title:

Date:

FIG. 35

NON-DISCLOSURE AGREEMENT

This Agreement is made and entered into . . . . . .
. . . . .

The Parties have caused their respective authorized representatives to sign this Agreement as of the Effective Date.

A Corporation

Name: John Smith

Title: Senior Vice President

Date: 12/15/2016 — 710

*John Smith* — 712

B Corporation

Name:

Title:

Date:

INPUT DISPLAY DEVICE AND INPUT DISPLAY METHOD

BACKGROUND

1. Field

The present disclosure relates to an input display device that displays characters which are inputted by handwriting by a user and an input display method for displaying the characters.

2. Description of the Related Art

In general, a technique for generating stroke data is known (for example, Japanese Unexamined Patent Application Publication No. 11-259598). In the technique described in Japanese Unexamined Patent Application Publication No. 11-259598, stroke data is generated when the user fills in a form displayed on a screen by handwriting and then the stroke data is displayed on the screen as handwritten characters.

A technique for converting stroke data into recognized characters is known (for example, Japanese Patent No. 3855696). In the technique described in Japanese Patent No. 3855696, when the user fills in a form displayed on a screen by handwriting, character recognition is conducted and the stroke data is converted into characters to be displayed on the screen.

However, in the technique described in Japanese Patent No. 3855696, the recognized characters are displayed on the screen each time when the user performs handwriting on the screen. That is, in the technique described in Japanese Patent No. 3855696, the user has to perform handwriting for every input fields in the form to fill out.

For example, in a case where a document displayed on a screen is a form that has input fields in which a user's name or the like is to be written, the user wants to perform handwriting for all input fields at once.

SUMMARY

It is desirable to provide an input display device and an input display method that the user may suitably perform handwriting input.

According to an aspect of the disclosure, there is provided an input display device which includes a display unit that displays a screen for handwriting input on an input screen including a plurality of input fields, a stroke data processing unit that groups stroke data when handwriting input is performed on the screen for handwriting input into stroke data representing a character string to generate grouped stroke data as grouping stroke data, a character recognition unit that conducts character recognition on the grouping stroke data and converts the grouping stroke data into at least one recognized character, and a control processing unit that displays the at least one recognized character at the plurality of input fields of the input screen correlated with positions, at which handwriting input was performed in the screen for handwriting input.

According to another aspect of the disclosure, there is provided an input display method which includes displaying a screen for handwriting input on an input screen including a plurality of input fields, grouping stroke data when handwriting input is performed on the screen for handwriting input into stroke data representing a character string and generating grouped stroke data as grouping stroke data, conducting character recognition on the grouping stroke data and converting the grouping stroke data into at least one recognized character, and displaying the at least one recognized character at the plurality of input fields of the input screen correlated with positions, at which handwriting input was performed in the screen for handwriting input.

BRIEF DESCRIPTION OF THE DRAWINGS

FIG. 13 is a diagram for explaining an operation of an input display device according to a second embodiment;

FIG. 14 is a diagram for explaining the operation of the input display device according to the second embodiment;

FIG. 15 is a diagram for explaining the operation of the input display device according to the second embodiment;

FIG. 16 is a diagram for explaining the operation of the input display device according to the second embodiment;

FIG. 17 is a diagram for explaining the operation of the input display device according to the second embodiment;

FIG. 20 is a diagram for explaining the operation of the input display device according to the third embodiment;

FIG. 21 is a diagram for explaining the operation of the input display device according to the third embodiment;

FIG. 22 is a diagram for explaining the operation of the input display device according to the third embodiment;

FIG. 23 is a diagram for explaining the operation of the input display device according to the third embodiment;

FIG. 24 is a diagram for explaining the operation of the input display device according to the third embodiment;

FIG. 25 is a diagram for explaining an operation of an input display device according to a fourth embodiment;

FIG. 26 is a diagram for explaining the operation of the input display device according to the fourth embodiment;

FIG. 27 is a diagram for explaining the operation of the input display device according to the fourth embodiment;

FIG. 28 is a diagram for explaining an operation of an input display device according to a seventh embodiment;

FIG. 29 is a diagram for explaining the operation of the input display device according to the seventh embodiment;

FIG. 31 is a diagram for explaining the operation of the input display device according to the eighth embodiment;

FIG. 32 is a diagram for explaining the operation of the input display device according to the eighth embodiment;

FIG. 35 is a diagram for explaining the operation of the input display device according to the ninth embodiment.

DESCRIPTION OF THE EMBODIMENTS

In the following, embodiments will be described with reference to the accompanying drawings.

First Embodiment

Figure 1:
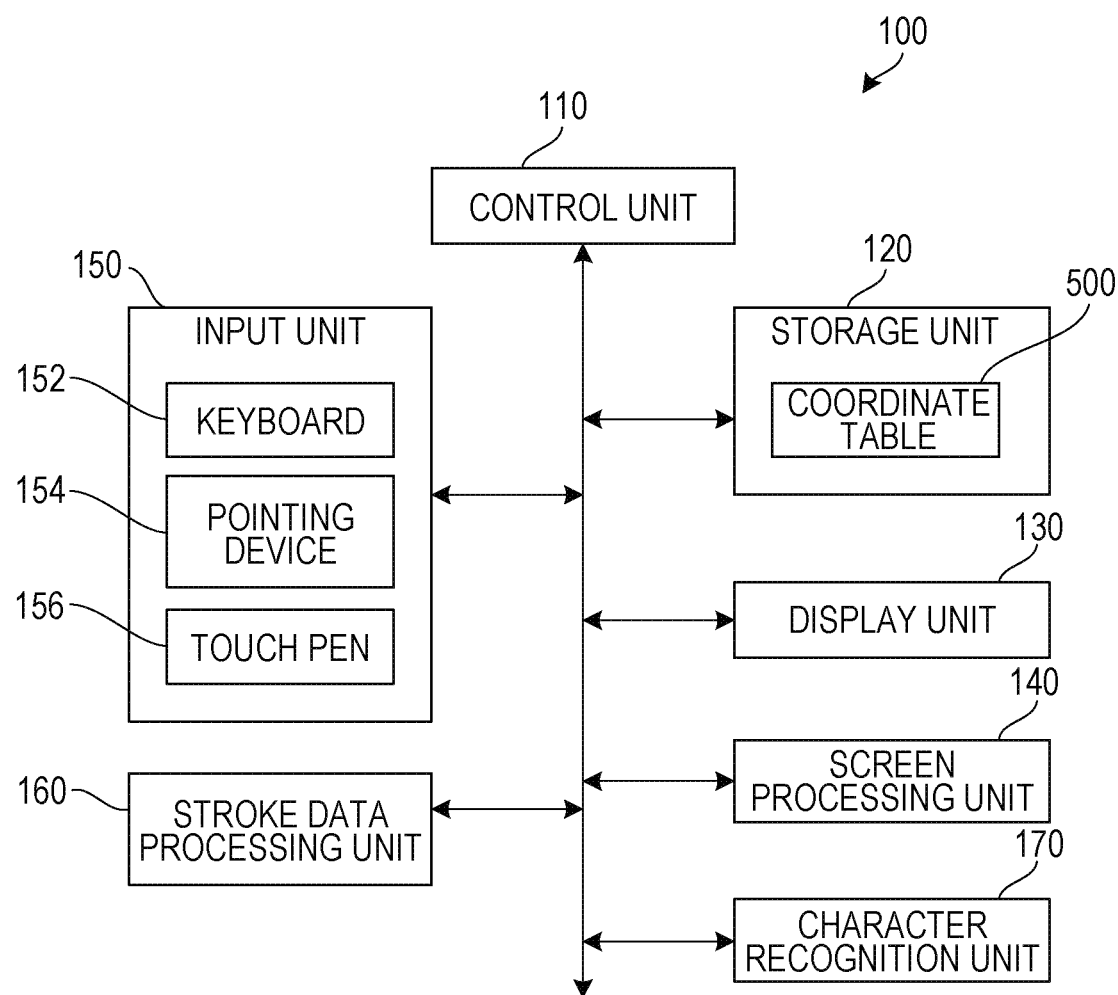
FIG. 1 is a diagram illustrating a configuration of an input display device according to a first embodiment.

FIG. 1 is a diagram illustrating a configuration of an input display device 100 according to a first embodiment. The input display device 100 includes a control unit 110, a storage unit 120, a display unit 130, a screen processing unit 140, an input unit 150, a stroke data processing unit 160, and a character recognition unit 170.

The control unit 110 is a functional unit for controlling the entire input display device 100. The control unit 110 reads and executes various computer programs (in the following, referred to as a program) stored in the storage unit 120 to thereby realize various functions and is configured with, for example, a central process unit (CPU).

The storage unit 120 is a functional unit that stores various programs or various pieces of data demanded for an operation of the input display device 100. The storage unit 120 is configured with, for example, a semiconductor memory or a hard disk drive (HDD). The storage unit 120 stores a coordinate table 500 which will be described later.

The display unit 130 is a touch panel display and is configured with, for example, a liquid crystal display (LCD) and a touch panel. The screen processing unit 140 is a control processing unit that performs processing for controlling the display of various screens on the display unit 130.

The input unit 150 includes a keyboard 152, a pointing device 154, and a touch pen 156. For example, the user may perform handwriting input to a screen using the pointing device 154 or the touch pen 156. The stroke data processing unit 160 generates characters which are inputted by handwriting as stroke data which will be described later.

The character recognition unit 170 conducts optical character recognition (generally abbreviated as OCR) to at least one character (stroke data) which is inputted by handwriting and converts the at least one character into the at least one recognized character which is a character capable of being edited by a computer.

Figure 2:
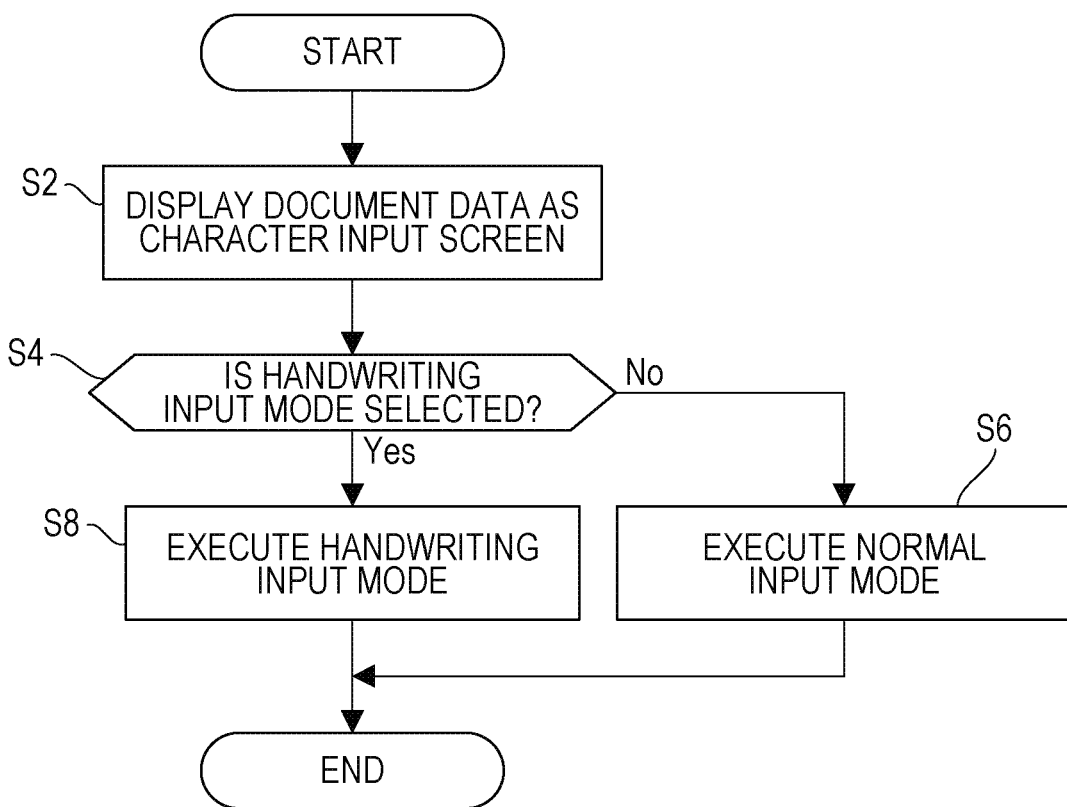
FIG. 2 is a flowchart illustrating an operation of the input display device according to the first embodiment.
Figure 3:
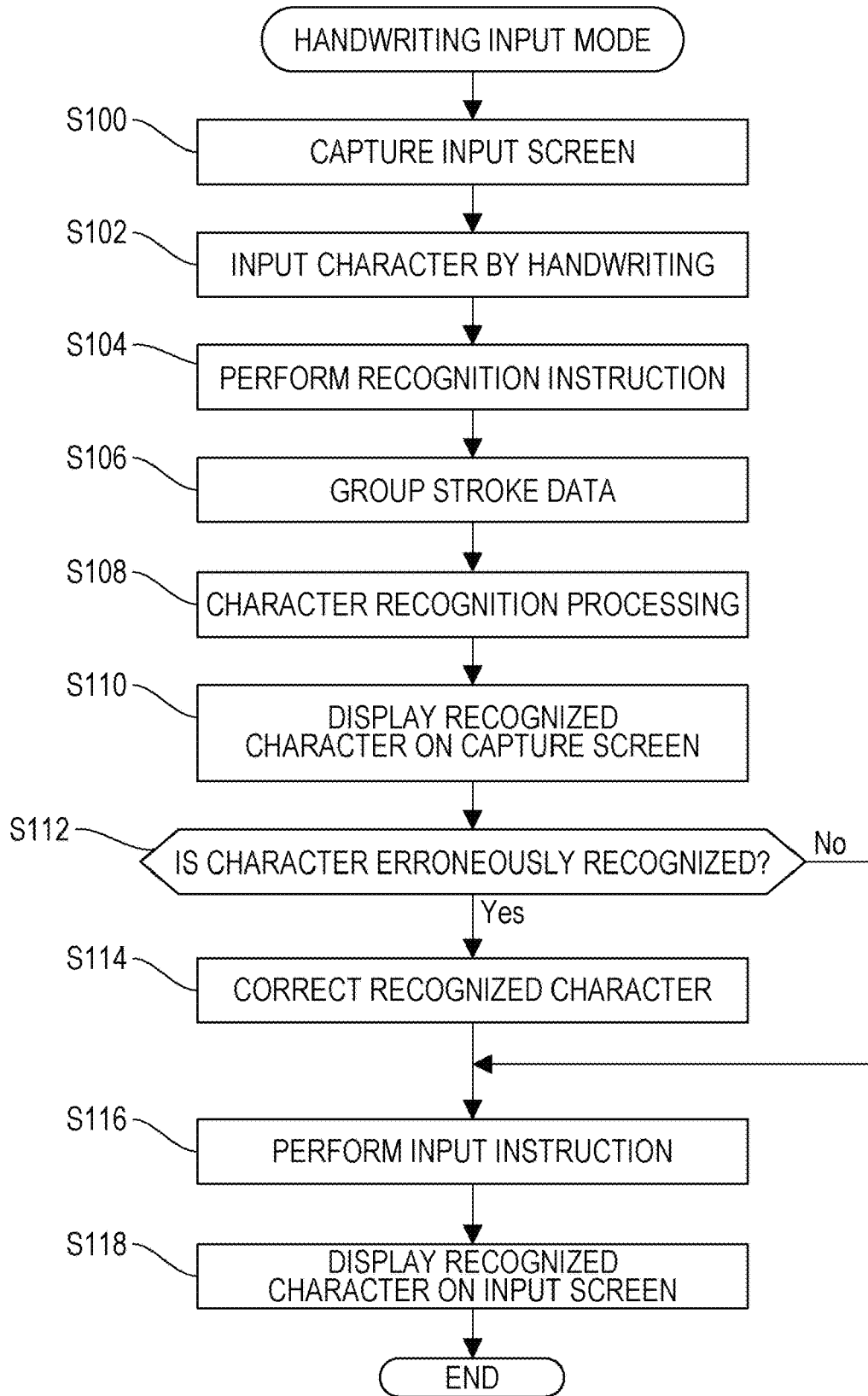
FIG. 3 is a flowchart illustrating a handwriting input mode as an operation of the input display device according to the first embodiment.

The operation of the input display device 100 according to the first embodiment will be described using FIGS. 2 to 11. FIG. 2 is a flowchart illustrating an operation of the input display device 100 according to the first embodiment. FIG. 3 is a flowchart illustrating a handwriting input mode as an operation of the input display device 100 according to the first embodiment. FIGS. 4 to 11 are diagrams for explaining the operation of the input display device 100 according to the first embodiment.

First, a normal input mode will be described. The screen processing unit 140 displays document data on the display unit 130 as an input screen 200 (see FIG. 4) (Step S2 of FIG. 2).

Figure 4:
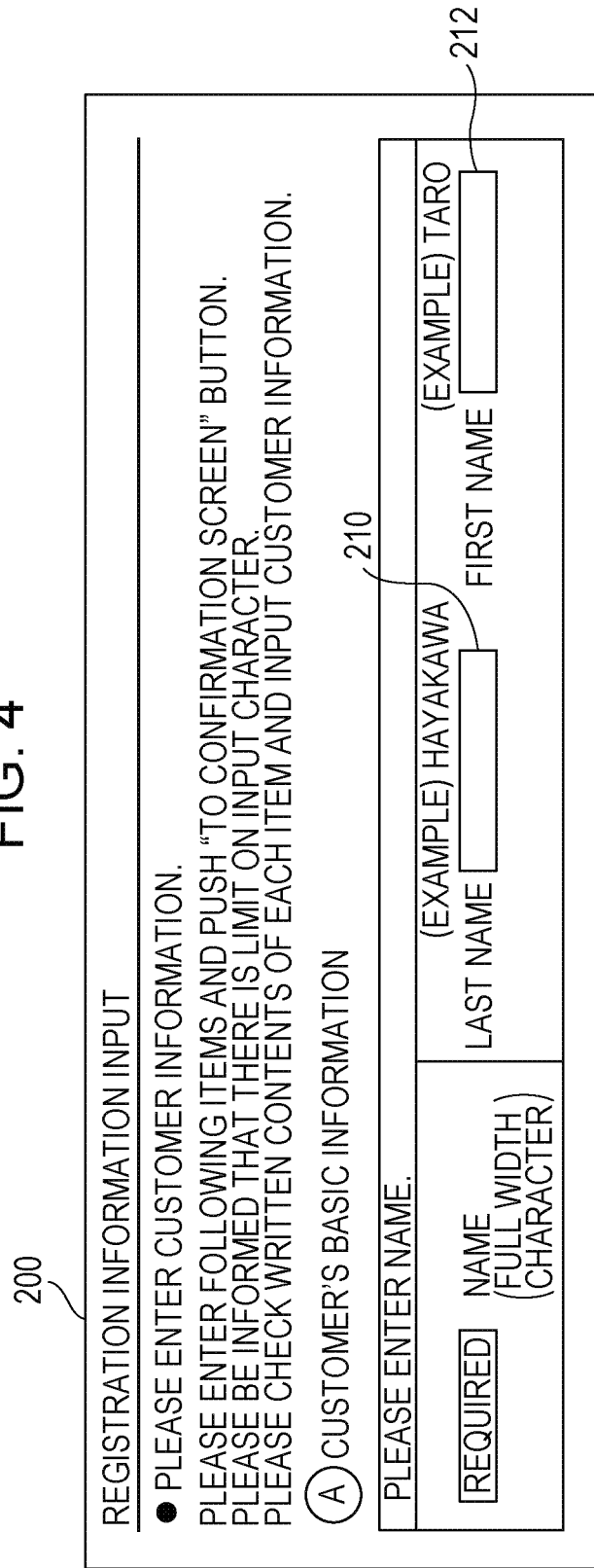
FIG. 4 is a diagram for explaining the operation of the input display device according to the first embodiment.

As illustrated in FIG. 4, the input screen 200 (document data) includes a plurality of input fields 210 and 212 as input positions. The input fields 210 and 212 are positions (fields) at which a last name and a first name, which are a name of a user, are input by Chinese characters and Hiragana characters, respectively.

The user selects the normal input mode using the input unit 150 (keyboard 152) (No in Step S4 of FIG. 2). In this case, the normal input mode is executed (Step S6 of FIG. 2).

Figure 11:
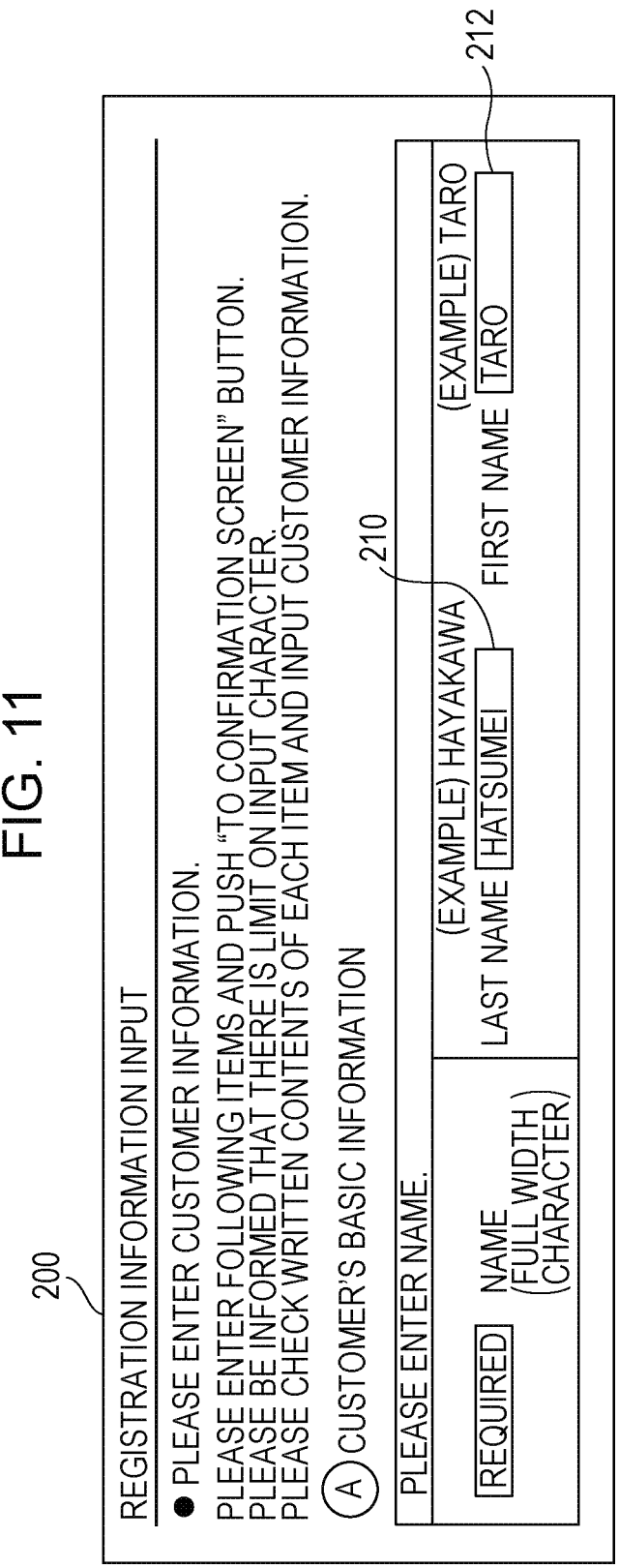
FIG. 11 is a diagram for explaining the operation of the input display device according to the first embodiment.

In the normal input mode, the user inputs characters (character string) of "HATSUMEI" and "TARO" using the input unit 150 (keyboard 152) to the plurality of input fields 210 and 212 of the input screen 200 displayed on the display unit 130, respectively. As illustrated in FIG. 11, the screen processing unit 140 displays the input screen 200, in which characters of "HATSUMEI" and "TARO" are displayed at the respective input fields 210 and 212, on the display unit 130.

Next, a handwriting input mode will be described. The screen processing unit 140 displays document data on the display unit 130 as the input screen 200 (see FIG. 4) (Step S2 of FIG. 2). Document data is data representing a document by a hypertext markup language (HTML), a portable document format (PDF), or the like.

Figure 5:
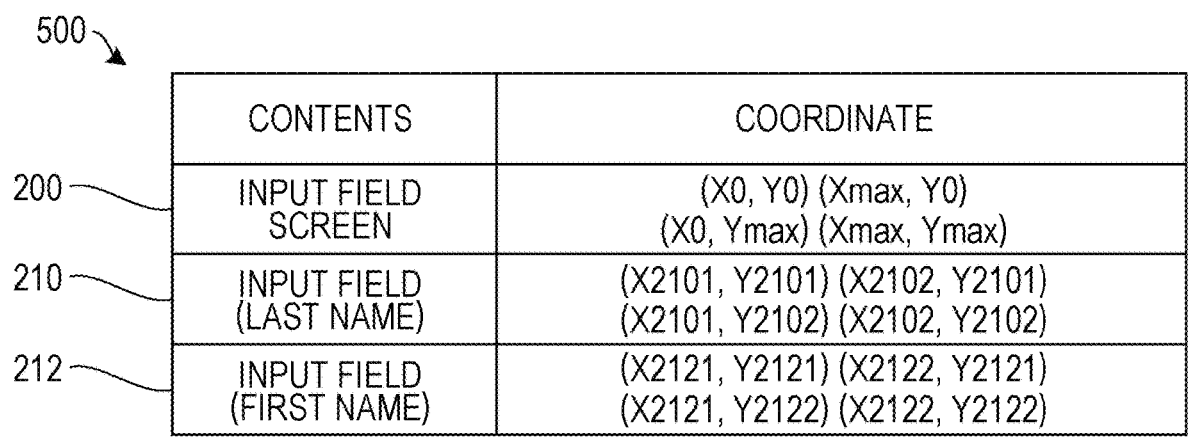
FIG. 5 is a diagram for explaining the operation of the input display device according to the first embodiment.

As illustrated in FIG. 5, in a coordinate table 500, data representing the X coordinate and Y coordinate for the input screen 200 and the input fields 210 and 212 are stored. Specifically, the input screen 200 is correlated with the minimum value "X0" of the X coordinate, the maximum value "Xmax" of the X coordinate, the minimum value "Y0" of the Y coordinate, and the maximum value "Ymax" of the Y coordinate. The input field 210 is correlated with the minimum value "X2101" of the X coordinate, the maximum value "X2102" of the X coordinate, the minimum value "Y2101" of the Y coordinate, and the maximum value "Y2102" of the Y coordinate. The input field 212 is correlated with the minimum value "X2121" of the X coordinate, the maximum value "X2122" of the X coordinate, the minimum value "Y2121" of the Y coordinate, and the maximum value "Y2122" of the Y coordinate.

The user selects the handwriting input mode using the input unit 150 (pointing device 154 or touch pen 156) (Yes in Step S4 of FIG. 2). In this case, the handwriting input mode is executed (Step S8 of FIG. 2).

Figure 6:
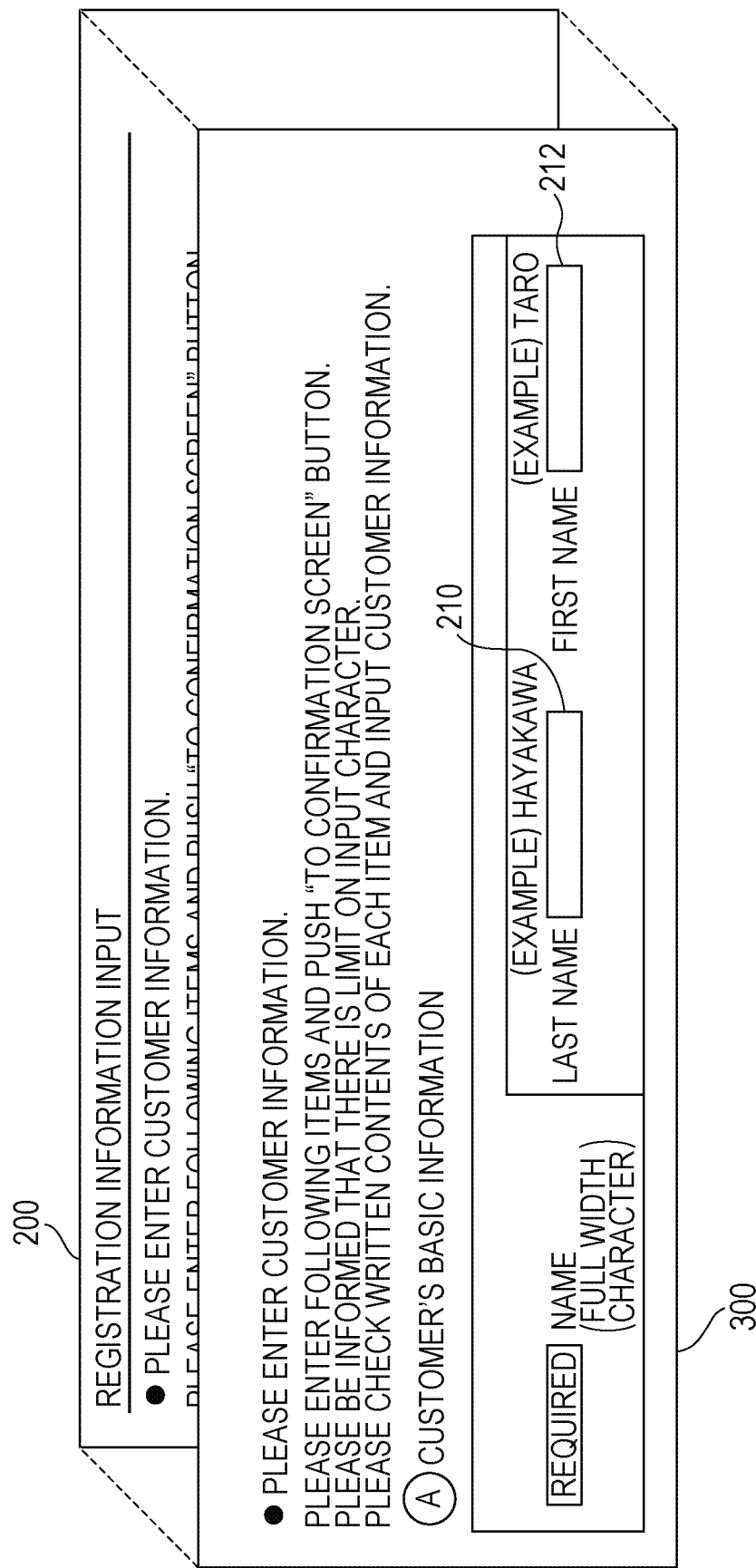
FIG. 6 is a diagram for explaining the operation of the input display device according to the first embodiment.

In the handwriting input mode, as illustrated in FIG. 6, the screen processing unit 140 captures the input screen 200 displayed on the display unit 130 as a capture screen 300. The screen processing unit 140 saves the capture screen 300 in the storage unit 120 and also displays the capture screen 300 on the input screen 200 (Step S100 of FIG. 3).

Figure 7:
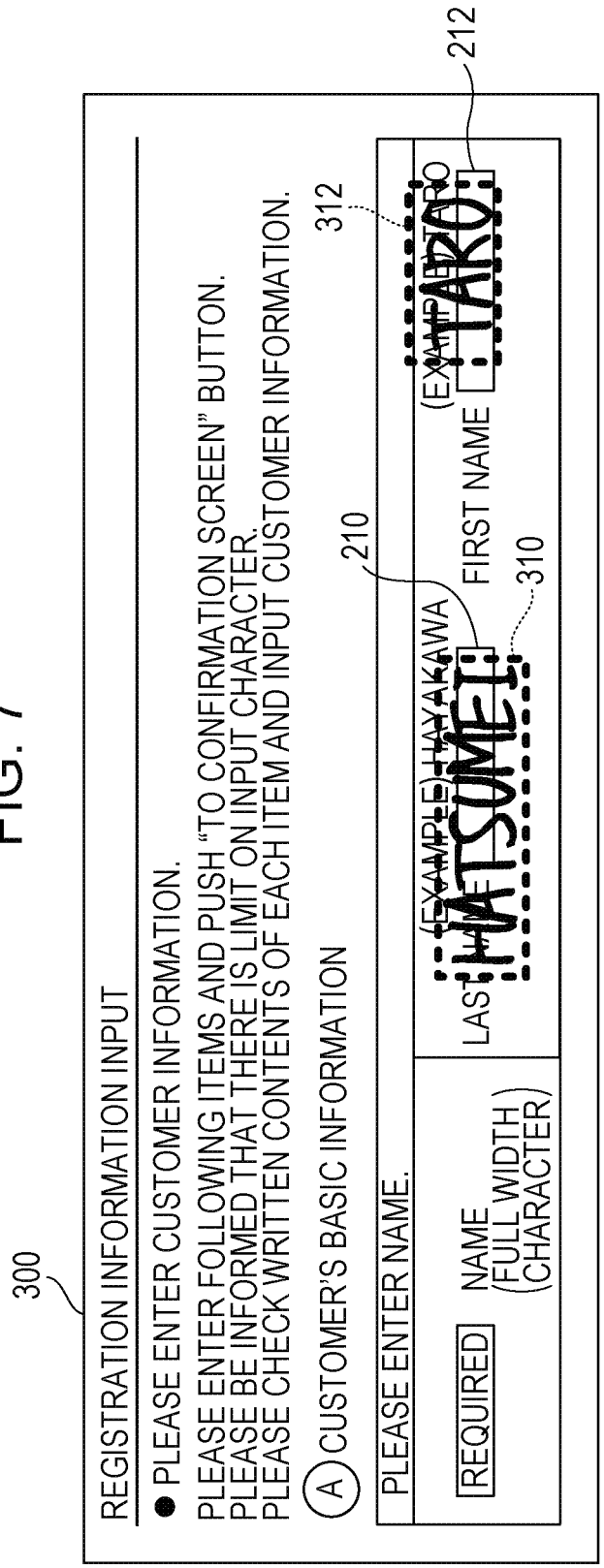
FIG. 7 is a diagram for explaining the operation of the input display device according to the first embodiment.

As illustrated in FIG. 7, the user inputs characters "HATSUMEI" and "TARO" in the plurality of input fields 210 and 212 of the capture screen 300 by handwriting using the input unit 150 (pointing device 154 or touch pen 156) (Step S102 of FIG. 3).

In this case, the user may input characters "HATSUMEI" and "TARO" by handwriting by extending beyond the plurality of input fields 210 and 212 of the capture screen 300. The stroke data processing unit 160 generates a plurality of coordinate columns configuring input characters, which are inputted to the capture screen 300 by handwriting, as stroke data, respectively, and saves the stroke data in the storage unit 120.

The user performs a recognition instruction using the input unit 150 (pointing device 154 or touch pen 156) (Step S104 of FIG. 3).

In this case, as illustrated in FIG. 7, the stroke data processing unit 160 groups stroke data saved in the storage unit 120 into stroke data representing a character string correlated with the input fields 210 and 212 and generates grouped stroke data as pieces of grouping stroke data 310 and 312 (Step S106 of FIG. 3).

Figure 8:
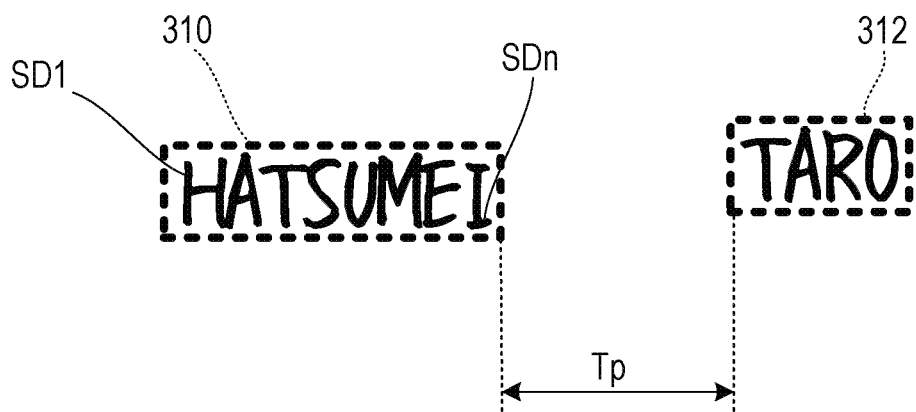
FIG. 8 is a diagram for explaining the operation of the input display device according to the first embodiment.

Step S106 will be described using FIG. 8. Each of pieces of grouping stroke data 310 and 312 represents pieces of stroke data spanning from first stroke data SD1 to last stroke data SDn (n is an integer of 1 or more) when the user input by handwriting. The pieces of stroke data spanning from first stroke data SD1 to last stroke data SDn constitutes a single piece of grouping stroke data when a predetermined time Tp elapsed after the user finished handwriting input (for example, in a case of the touch pen 156, from the time when the pen is lifted up).

Here, in a technique for grouping the pieces of stroke data spanning from first stroke data SD1 to last stroke data SDn, position information representing a position when input was performed by handwriting may be used, instead of time information such as a predetermined time Tp. For example, clustering by a Ward method is known, as the technique for grouping pieces of data using position information. In the grouping technique, time information and position information may be combined with each other to be used. In FIG. 8, although the character string referred to as "HATSUMEI" is grouped, grouping is performed on, for example, "HATSU", "MEI", and each character and then, the character string referred to as "HATSUMEI" may be grouped.

The character recognition unit 170 conducts character recognition on pieces of grouping stroke data 310 and 312 and converts each of the pieces of grouping stroke data 310 and 312 into each of recognized characters (recognized character string) 410 and 412 as characters capable of being edited by a computer (Step S108 of FIG. 3). The recognized characters of the present specification may be a single character or a plurality of characters and includes a character and character string.

Figure 9:
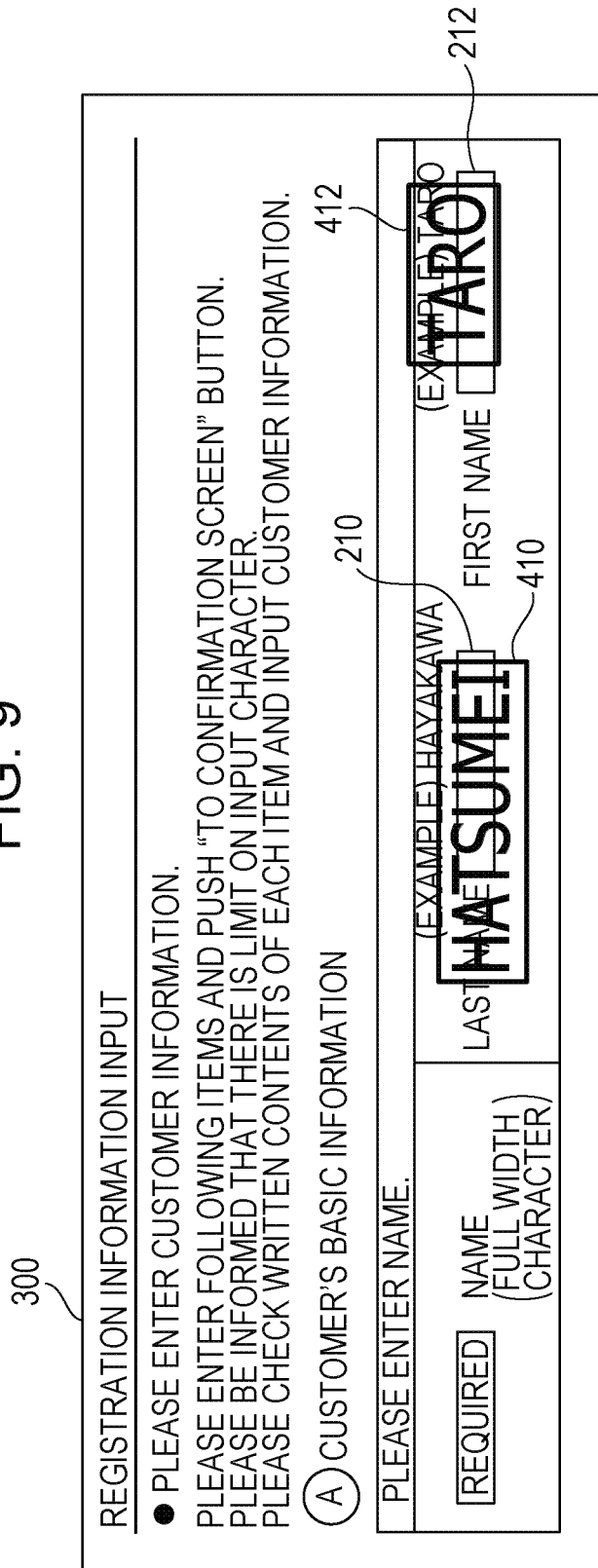
FIG. 9 is a diagram for explaining the operation of the input display device according to the first embodiment.

In this case, as illustrated in FIG. 9, the screen processing unit 140 displays the recognized characters 410 and 412 on the position at which input was performed to the capture screen 300 by handwriting (Step S110 of FIG. 3). The recognized characters 410 and 412 represent characters "HATSUMEI" and "TARO", respectively.

Figure 10:
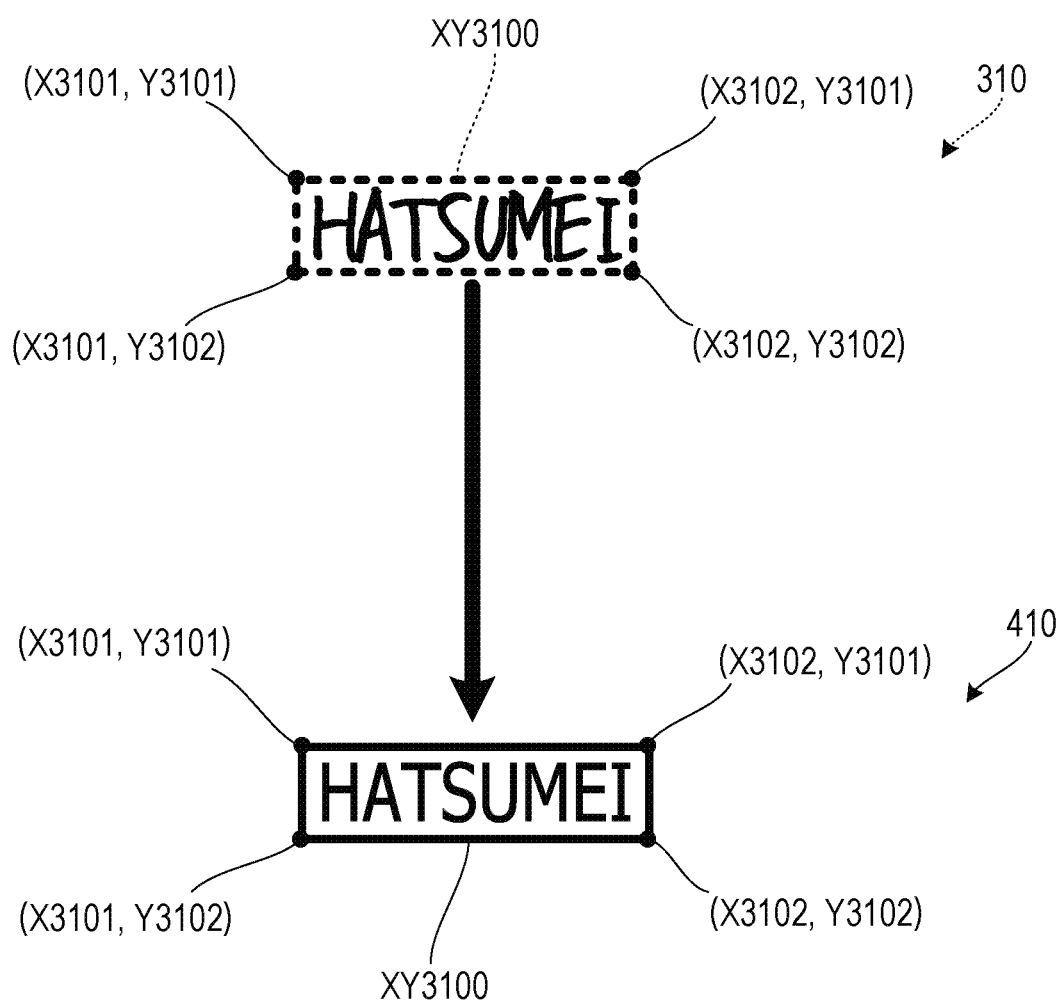
FIG. 10 is a diagram for explaining the operation of the input display device according to the first embodiment.

Step S110 will be described using FIG. 10. The screen processing unit 140 detects the coordinate of each of the pieces of grouping stroke data 310 and 312. In a case where the grouping stroke data 310 is used as an example, the screen processing unit 140 detects the minimum value "X3101" of the X coordinate, the maximum value "X3102" of the X coordinate, the minimum value "Y3101" of the Y coordinate, and the maximum value "Y3102" of the Y coordinate of the capture screen 300 for grouping stroke data 310 and recognizes (X3101, Y3101) (X3102, Y3101) (X3101, Y3102) (X3102, Y3102) as a coordinate region XY 3100 of the coordinates. The screen processing unit 140 changes (expands) a character size of the characters "HATSUMEI" which are the recognized characters 410 from a set character size, which is preset, to a character size based on the coordinate region 3100. For example, the screen processing unit 140 determines a magnification scale factor for the set character size. The screen processing unit 140 displays the characters "HATSUMEI" which are the recognized characters 410 on the coordinate region XY 3100 of the capture screen 300 in a character size based on the coordinate region 3100.

For example, in a case where it is determined that there is no error in at least one recognized character of the recognized characters 410 and 412 displayed on the capture screen 300 (No in Step S112 of FIG. 3), the user executes Step S116 which will be described later.

On the other hand, in a case where it is determined that there is an error in at least one recognized character of the recognized characters 410 and 412 displayed on the capture screen 300 (Yes in Step S112 of FIG. 3), the user performs correction on the at least one recognized character (Step S114 of FIG. 3). Specifically, Steps S102, S104, S106, S108, and S110 are executed for the at least one recognized character. Otherwise, in Step S114, a soft keyboard is displayed on the capture screen 300 and correction may be performed on the at least one recognized character.

The user performs an input instruction using the input unit 150 (pointing device 154 or touch pen 156) (Step S116 of FIG. 3).

In this case, as illustrated in FIG. 11, the screen processing unit 140 displays the input screen 200 in which the recognized characters 410 and 412 are displayed at the input fields 210 and 212, respectively, instead of the capture screen 300 (Step S118 of FIG. 3). Characters "HATSUMEI" and "TARO" are displayed in the input fields 210 and 212 of the input screen 200, respectively.

Step S118 will be described using FIG. 12. The screen processing unit 140 determines whether the coordinate region detected for the pieces of grouping stroke data 310 and 312 and the coordinate region of the input fields 210 and 212 of the input screen 200 overlap each other, respectively, or not. In a case where grouping stroke data 310 is used as an example, (X3101, Y3101) (X3102, Y3101) (X3101, Y3102) (X3102, Y3102) for grouping stroke data 310 is already recognized, as the coordinate region XY 3100 of the capture screen 300, by the screen processing unit 140. The screen processing unit 140 references the coordinate table 500 to thereby recognize (X2101, Y2101) (X2102, Y2101) (X2101, Y2102) (X2102, Y2102) as the coordinate region XY 2100 of the input field 210 of the input screen 200.

Figure 12:
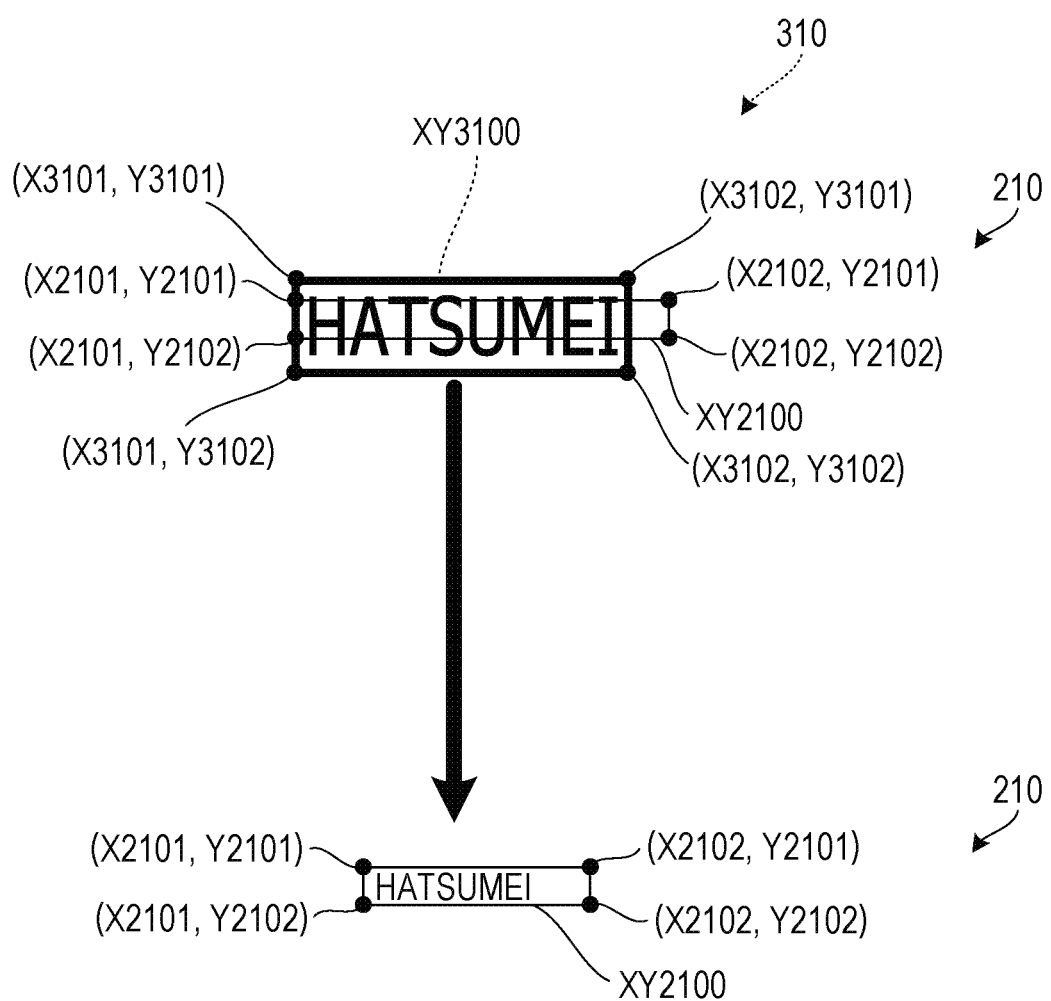
FIG. 12 is a diagram for explaining the operation of the input display device according to the first embodiment.

As illustrated in FIG. 12, if X2101≤X3101≤X2102 and Y2101≤Y3101≤Y2102, or X2101≤X3102≤X2102 and Y2101≤Y3102≤Y2102, the coordinate region XY 3100 of the capture screen 300 and the coordinate region XY 2100 of the input field 210 of the input screen 200 overlap each other. In this case, the screen processing unit 140 changes (reduces) the character size of the characters "HATSUMEI" which are the recognized characters 410 from a character size based on the coordinate region 3100 to a character size based on the coordinate region XY 2100. The screen processing unit 140 determines, for example, a reduction scale factor for the character size based on the coordinate region 3100. The screen processing unit 140 displays the characters "HATSUMEI" which are the recognized characters 410 on the input field 210 of the input screen 200 in the character size based on the coordinate region XY 2100.

Here, in a case where the coordinate region XY 3100 of the capture screen 300 of a recognition result overlaps the coordinate region of the input fields 210 and 212 of the input screen 200, the input field 210, which is nearest to the center of the coordinate region XY 3100 of the recognition result, of the input fields 210 and 212 of the input screen 200 may be selected. In general, in a case where a horizontal writing character is written by handwriting, writing is started from the left upper corner. In a case where, the coordinate region XY 3100 of the capture screen 300 of the recognition result overlaps the coordinate region of the input fields 210 and 212 of the input screen 200, the input field 210 at the far left and uppermost side of the input fields 210 and 212 of the input screen 200 may be selected.

As described above, the input display device 100 according to the first embodiment includes the display unit 130 that displays the input screen 200 including the input fields 210 and 212, the screen processing unit 140 that captures the input screen 200 displayed on the display unit 130 as the screen for handwriting input (capture screen 300) and displays the capture screen 300 on the input screen 200, the stroke data processing unit 160 that groups stroke data when input was performed on the capture screen 300 by handwriting into stroke data which represents the character string, which is in correlation with the input fields 210 and 212, and generates the stroke data as pieces of grouping stroke data 310 and 312, and the character recognition unit 170 that conducts character recognition on the pieces of grouping stroke data 310 and 312 and converts the pieces of grouping stroke data 310 and 312 into the recognized characters 410 and 412. In this case, the character recognition unit 170 converts the pieces of grouping stroke data 310 and 312 into the recognized characters 410 and 412 based on the input fields 210 and 212 of the input screen 200 and the screen processing unit 140 displays the recognized characters 410 and 412 at the input fields 210 and 212 of the input screen 200. For that reason, in the input display device 100 according to the first embodiment, the user may collectively perform handwriting input without causing the user to input the character string by handwriting every time as in the technique described in Japanese Patent No. 3855696.

Here, in the input display device 100 according to the first embodiment, in a case where pieces of grouping stroke data 310 and 312 are displaced with respect to the input fields 210 and 212 of the input screen 200, the screen processing unit 140 displays the recognized characters 410 and 412, which are obtained by conducting character recognition on the pieces of grouping stroke data 310 and 312, at the input fields 210 and 212 based on the coordinate regions of the pieces of grouping stroke data 310 and 312 and the coordinate regions of the input fields 210 and 212. For example, a portion of the coordinate regions of the pieces of grouping stroke data 310 and 312 overlaps the coordinate regions of the input fields 210 and 212, but a portion of the coordinate regions of the pieces of grouping stroke data 310 and 312 is extended beyond the coordinate regions of the input fields 210 and 212. Also, in this case, the recognized characters 410 and 412 obtained by conducting character recognition on the pieces of grouping stroke data 310 and 312 may be displayed at the input fields 210 and 212 based on these coordinate regions.

In the present embodiment, although the at least one recognized character is displayed on the capture screen 300 once, the at least one recognized character may also be output to an input field (for example, input form) of the input screen 200 as a simple text character (character string). Specifically, in a case where the input field 210 is an input field such as a text box in FIG. 11, a text character string of "HATSUMEI" may be output (handed over) to the input field.

That is, a text input field which is close to a position, at which the text character is input as the input character, is recognized. The at least one recognized character may also be output to the name (for example, if an HTML file is present, a text box specified by "<input type="text" name="abc">") of the text input field as a text.

Second Embodiment

In the second embodiment, for example, an input field for receiving a full width Katakana character or a half width numeral is included in the input screen 200, as restriction information restricting a type of a character.

The operations of the input display device 100 according to the second embodiment will be described using FIGS. 2, 3, and 13 to 17. FIGS. 13 to 17 are diagrams for explaining the operations of the input display device 100 according to the second embodiment.

First, a normal input mode will be described. The screen processing unit 140 displays document data on the display unit 130 as the input screen 200 (see FIG. 13) (Step S2 of FIG. 2).

As illustrated in FIG. 13, the input screen 200 (document data) also includes a plurality of input fields 220, 222, 230, 232, and 234. The input fields 220 and 222 are Katakana input fields for receiving the last name and first name which are a name of the user using Katakana character, respectively. The input fields 230, 232, and 234 are numeric input fields for receiving a year (A.D.), month, and day which are date of birth of the user using a numeral, respectively.

As illustrated in FIG. 14, the coordinate table 500 also stores data representing the X coordinate and the Y coordinate for the input fields 220 and 222, 230, 232, and 234. Specifically, the input field 220 is correlated with the minimum value "X2201" of the X coordinate, the maximum value "X2202" of the X coordinate, the minimum value "Y2201" of the Y coordinate, and the maximum value "Y2202" of the Y coordinate. The input field 222 is correlated with the minimum value "X2221" of the X coordinate, the maximum value "X2222" of the X coordinate, the minimum value "Y2221" of the Y coordinate, and the maximum value "Y2222" of the Y coordinate. The input field 230 is correlated with the minimum value "X2301" of the X coordinate, the maximum value "X2302" of the X coordinate, the minimum value "Y2301" of the Y coordinate, and the maximum value "Y2302" of the Y coordinate. The input field 232 is correlated with the minimum value "X2321" of the X coordinate, the maximum value "X2322" of the X coordinate, the minimum value "Y2321" of the Y coordinate, and the maximum value "Y2322" of the Y coordinate. The input field 234 is correlated with the minimum value "X2341" of the X coordinate, the maximum value "X2342" of the X coordinate, the minimum value "Y2341" of the Y coordinate, and the maximum value "Y2342" of the Y coordinate.

As illustrated in FIG. 14, the coordinate table 500 stores restriction information restricting a type of a character for the input fields 220 and 222, 230, 232, and 234. Specifically, the input fields 220 and 222 are correlated with Katakana restriction information 520 for causing the user to input a full width Katakana character as the type of the character. The input fields 230, 232, and 234 are correlated with numeric restriction information 530 for causing the user to input a half width numeral as the type of the character. In a case where the coordinate table 500 is referenced and Katakana restriction information 520 is correlated with the input fields 220 and 222, the character recognition unit 170 recognizes that the input fields 220 and 222 for causing the user to input a full width Katakana character are present in the input screen 200. In a case where the coordinate table 500 is referenced and numeric restriction information 530 is correlated with the input fields 230, 232, and 234, the character recognition unit 170 recognizes that the input fields 230, 232, and 234 for causing the user to input a half width numeral are present in the input screen 200.

The user selects the normal input mode by using the input unit 150 (keyboard 152) (No in Step S4 of FIG. 2). In this case, the normal input mode is executed (Step S6 of FIG. 2).

In the normal input mode, the user inputs characters "HATSUMEI", "TARO", "hatsumei", "taro", "2016", "1", and "1" in the input fields 210 212, 220, 222, 230, 232, and 234 of the input screen 200 displayed on the display unit 130, respectively, by using the input unit 150 (keyboard 152). As illustrated in FIG. 11, the screen processing unit 140 displays the input screen 200, in which characters "HATSUMEI" and "TARO", characters "hatsumei" and "taro" by a full width Katakana character, and characters "2016", "1", and "1" by a half width numeral are displayed at the input fields 210 212, 220, 222, 230, 232, and 234, respectively, on the display unit 130.

Next, a handwriting input mode will be described. The screen processing unit 140 displays document data on the display unit 130 as the input screen 200 (see FIG. 13) (Step S2 of FIG. 2). Document data is data representing a document by a hypertext markup language (HTML), a portable document format (PDF), or the like.

The user selects the handwriting input mode using the input unit 150 (pointing device 154 or touch pen 156) (Yes in Step S4 of FIG. 2). In this case, the handwriting input mode is executed (Step S8 of FIG. 2).

In the handwriting input mode, the screen processing unit 140 captures the input screen 200 displayed on the display unit 130 as a capture screen 300 (see FIG. 15), and saves the capture screen 300 in the storage unit 120 and also displays the capture screen 300 on the input screen 200 (Step S100 of FIG. 3).

As illustrated in FIG. 15, the user inputs characters "HATSUMEI", "TARO", "hatsumei", "taro", "2016", "1", and "1" to the input fields 210, 212, 220, 222, 230, 232, and 234 of the capture screen 300 by handwriting using the input unit 150 (pointing device 154 or touch pen 156) (Step S102 of FIG. 3).

In this case, the user inputs characters "HATSUMEI", "TARO", "hatsumei", "taro", "2016", "1", and "1" by handwriting by extending beyond the input fields 210, 212, 220, 222, 230, 232, and 234 of the capture screen 300. The stroke data processing unit 160 generates coordinate columns configuring characters, which are inputted to the capture screen 300 by handwriting, as stroke data, respectively, and saves the stroke data in the storage unit 120.

The user performs a recognition instruction using the input unit 150 (pointing device 154 or touch pen 156) (Step S104 of FIG. 3).

In this case, as illustrated in FIG. 15, the stroke data processing unit 160 groups stroke data saved in the storage unit 120 into stroke data representing a character string correlated with the input fields 210 and 212, 220, 222, 230, 232, and 234 and generates grouped stroke data as pieces of grouping stroke data 310, 312, 320, 322, 330, 332, and 334 (Step S106 of FIG. 3).

The character recognition unit 170 conducts character recognition on pieces of grouping stroke data 310, 312, 320, 322, 330, 332, and 334 and converts each of pieces of grouping stroke data 310, 312, 320, 322, 330, 332, and 334 into each of recognized characters 410, 412, 420, 422, 430, 432, and 434 as characters capable of being edited by a computer (Step S108 of FIG. 3).

In this case, Katakana restriction information 520 is in correlation with the input fields 220 and 222 of the coordinate table 500 and thus, the character recognition unit 170 recognizes that the input fields 220 and 222 for causing the user to input a full width Katakana character are present in the input screen 200 to convert the recognized characters 420 and 422 into recognized characters 420 and 422 that represent a full width Katakana character. Numeric restriction information 530 is in correlation with the input fields 230, 232, and 234 of the coordinate table 500 and thus, the character recognition unit 170 recognizes that the input fields 230, 232, and 234 for causing the user to input a half width numeral are present in the input screen 200 to convert the recognized characters 430, 432, and 434 into the recognized characters 430, 432, and 434 that represent a half width numeral.

In this case, as illustrated in FIG. 16, the screen processing unit 140 displays the recognized characters 410, 412, 420, 422, 430, 432, and 434 on the position at which input was performed to the capture screen 300 by handwriting (Step S110 of FIG. 3). The recognized characters 410, 412, 420, 422, 430, 432, and 434 represent characters "HATSUMEI" and "TARO", characters "hatsumei" and "taro" by a full width Katakana character, and characters "2016", "1", and "1" by a half width numeral, respectively.

For example, in a case where it is determined that there is no error in at least one recognized character of the recognized characters 410, 412, 420, 422, 430, 432, and 434 displayed on the capture screen 300 (No in Step S112 of FIG. 3), the user executes Step S116 which will be described later.

On the other hand, in a case where it is determined that there is an error in at least one recognized character of the recognized characters 410, 412, 420, 422, 430, 432, and 434 displayed on the capture screen 300 (Yes in Step S112 of FIG. 3), the user performs correction on the at least one recognized character (Step S114 of FIG. 3). Specifically, Steps S102, S104, S106, S108, and S110 are executed for the at least one recognized character. Otherwise, in Step S114, correction may be performed on the at least one recognized character by displaying a soft keyboard on the capture screen 300.

The user performs an input instruction using the input unit 150 (pointing device 154 or touch pen 156) (Step S116 of FIG. 3).

In this case, as illustrated in FIG. 17, the screen processing unit 140 displays the input screen 200 in which the recognized characters 410, 412, 420, 422, 430, 432, and 434 are displayed at the input fields 210 212, 220, 222, 230, 232, and 234, respectively, instead of the capture screen 300 (Step S118 of FIG. 3). Characters "HATSUMEI" and "TARO", characters "hatsumei" and "taro" by a full width Katakana character, and characters "2016", "1", and "1" by a half width numeral are displayed on the input fields 210 212, 220, 222, 230, 232, and 234 of the input screen 200, respectively.

The input fields 230, 232 and 234 of the input screen 200 are fields for receiving a numeral and thus, may be a pull-down system that a user may select an arbitrary numeral.

As described above, the input display device 100 according to the second embodiment includes the display unit 130 that displays the input screen 200 including the input fields 210, 212, 220, 222, 230, 232, and 234, the screen processing unit 140 that captures the input screen 200 displayed on the display unit 130 as the screen for handwriting input (capture screen 300) and displays the capture screen 300 on the input screen 200, the stroke data processing unit 160 that groups stroke data when input was performed on the capture screen 300 by handwriting into stroke data which represents the character string, which is in correlation with the input fields 210, 212, 220, 222, 230, 232, and 234, and generates the stroke data as pieces of grouping stroke data 310, 312, 320, 322, 330, 332, and 334, and the character recognition unit 170 that conducts character recognition on the pieces of grouping stroke data 310, 312, 320, 322, 330, 332, and 334 and converts the pieces of grouping stroke data 310, 312, 320, 322, 330, 332, and 334 into the recognized characters 410, 412, 420, 422, 430, 432, and 434. In this case, the character recognition unit 170 converts the pieces of grouping stroke data 310, 312, 320, 322, 330, 332, and 334 into the recognized characters 410, 412, 420, 422, 430, 432, and 434 based on the input fields 210, 212, 220, 222, 230, 232, and 234 of the input screen 200 and the screen processing unit 140 displays the recognized characters 410, 412, 420, 422, 430, 432, and 434 at the input fields 210, 212, 220, 222, 230, 232, and 234 of the input screen 200, respectively. For that reason, in the input display device 100 according to the second embodiment, the user may collectively perform handwriting input without causing the user to input the character string by handwriting every time as in the technique described in Japanese Patent No. 3855696.

In the input display device 100 according to the second embodiment, pieces of restriction information 520 and 530 for restricting the type of the character are correlated with at least one of the input fields 220, 222, 230, 232, and 234 among the input fields 210, 212, 220, 222, 230, 232, and 234. The character recognition unit 170 converts pieces of grouping stroke data 310, 312, 320, 322, 330, 332, and 334 into the recognized characters 410, 412, 420, 422, 430, 432, and 434 based on the input fields 210, 212, 220, 222, 230, 232, and 234 and pieces of restriction information 520 and 530. For that reason, in the input display device 100 according to the second embodiment, a full width Katakana character may be displayed at the input fields 220 and 222 or a half width numeral may be displayed at the input fields 230, 232, and 234, as restriction information restricting the type of the character.

Here, in the input display device 100 according to the second embodiment, even in a case where pieces of grouping stroke data 310, 312, 320, 322, 330, 332, and 334 are displaced with respect to the input fields 210, 212, 220, 222, 230, 232, and 234 of the input screen 200, the screen processing unit 140 displays the recognized characters 410 and 412, 420, 422, 430, 432, and 434 obtained by conducting character recognition on the pieces of grouping stroke data 310, 312, 320, 322, 330, 332, and 334 at the input fields 210, 212, 220, 222, 230, 232, and 234 based on the coordinate regions of the pieces of grouping stroke data 310, 312, 320, 322, 330, 332, and 334, the coordinate regions of the input fields 210, 212, 220, 222, 230, 232, and 234, and pieces of restriction information 520 and 530. For example, a portion of the coordinate regions of pieces of grouping stroke data 320 and 322 among the pieces of grouping stroke data 310, 312, 320, 322, 330, 332, and 334 overlaps the coordinate regions of the input fields 220 and 222 among the input fields 210, 212, 220, 222, 230, 232, and 234, but a portion of the coordinate regions of pieces of grouping stroke data 320 and 322 among the pieces of grouping stroke data 310, 312, 320, 322, 330, 332, and 334 is extended beyond the coordinate regions of the input fields 220 and 222 among the input fields 210, 212, 220, 222, 230, 232, and 234. Also, in this case, the recognized characters 420 and 422 obtained by conducting character recognition on the pieces of grouping stroke data 320 and 322 may be displayed at the input fields 210 and 212 based on the coordinate region and restriction information (Katakana restriction information 520). For example, a portion of the coordinate regions of pieces of grouping stroke data 330, 332, and 334 among the pieces of grouping stroke data 310, 312, 320, 322, 330, 332, and 334 overlaps the coordinate regions of the input fields 230, 232, and 234 among the input fields 210, 212, 220, 222, 230, 232, and 234, but a portion of the coordinate regions of pieces of grouping stroke data 330, 332, and 334 among the pieces of grouping stroke data 310, 312, 320, 322, 330, 332, and 334 is extended beyond the coordinate regions of the input fields 230, 232, and 234 among the input fields 210, 212, 220, 222, 230, 232, and 234. Also, in this case, the recognized characters 430, 432, and 434 obtained by conducting character recognition on the pieces of grouping stroke data 330, 332, and 334 may be displayed at the input fields 230, 232, and 234 based on the coordinate region and restriction information (numeric restriction information 530).

Third Embodiment

In the third embodiment, for example, an input field for allowing a user to select (designate) is included in the input screen 200, as attribute information.

Figure 18:
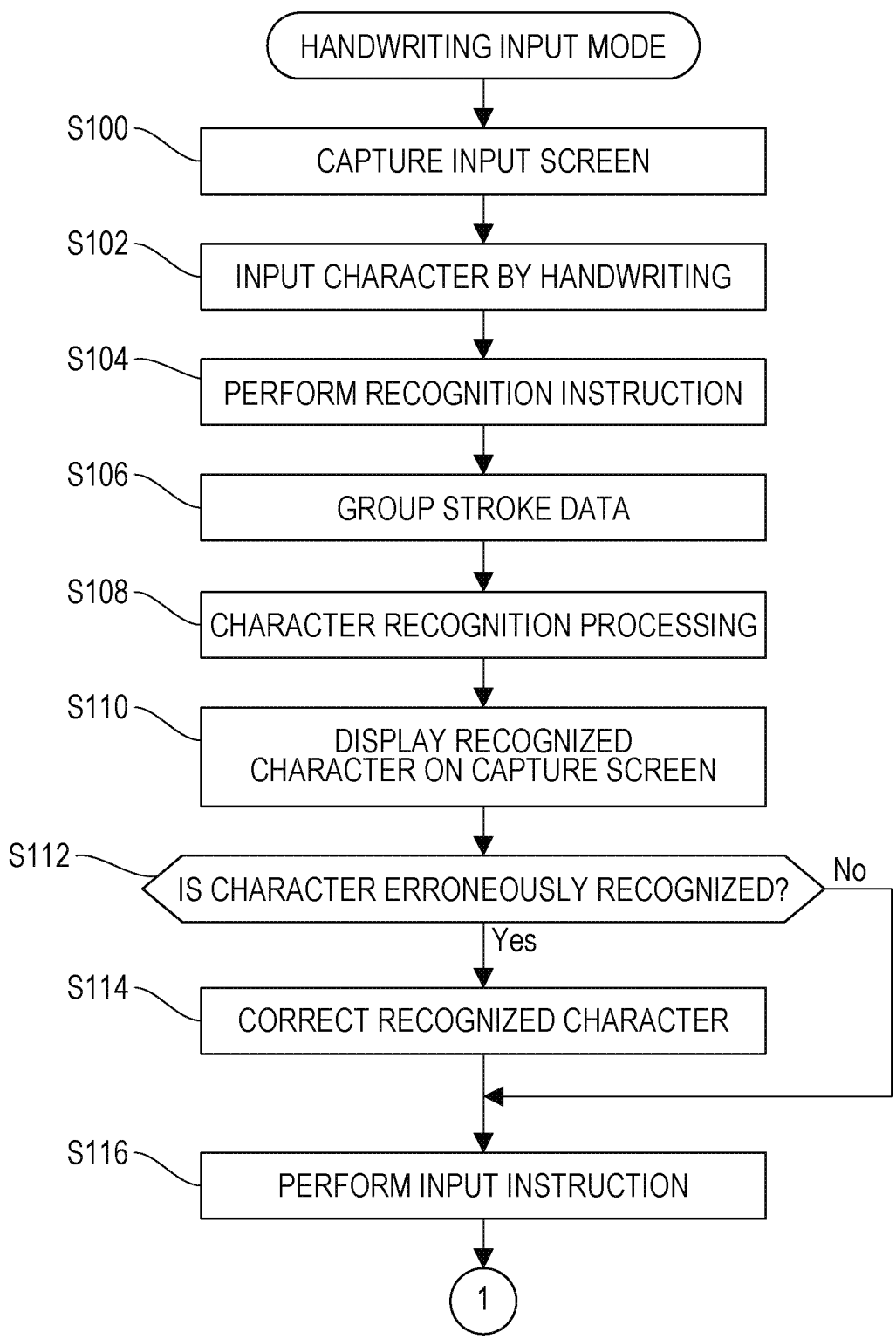
FIG. 18 is a flowchart illustrating a handwriting input mode as an operation of an input display device according to a third embodiment.
Figure 19:
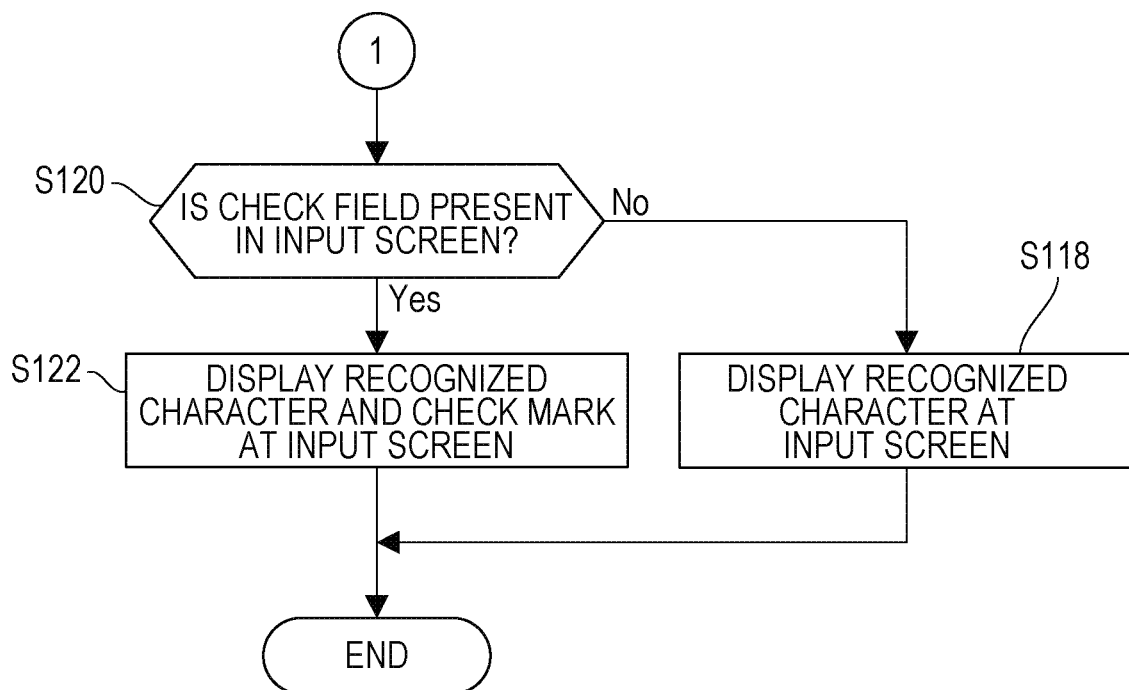
FIG. 19 is a flowchart illustrating the handwriting input mode as the operation of the input display device according to the third embodiment.

The operations of the input display device 100 according to the third embodiment will be described using FIGS. 2 and 18 to 24. FIGS. 18 and 19 are flowcharts illustrating a handwriting input mode as an operation of the input display device 100 according to the third embodiment. FIGS. 20 to 24 are diagrams for explaining the operation of the input display device 100 according to the third embodiment.

First, the normal input mode will be described. The screen processing unit 140 displays document data on the display unit 130 as the input screen 200 (see FIG. 20) (Step S2 of FIG. 2).

As illustrated in FIG. 20, the input screen 200 (document data) also includes input fields 240 and 242. Each of the input fields 240 and 242 is a check input field (so-called checkbox) for allowing a user to select (designate) a male or a female as gender by attaching a check mark (for example, "V").

As illustrated in FIG. 21, the coordinate table 500 also stores data representing the X coordinate and the Y coordinate for the input fields 240 and 242. Specifically, the input field 240 is correlated with the minimum value "X2401" of the X coordinate, the maximum value "X2402" of the X coordinate, the minimum value "Y2401" of the Y coordinate, and the maximum value "Y2402" of the Y coordinate. The input field 242 is correlated with the minimum value "X2421" of the X coordinate, the maximum value "X2422" of the X coordinate, the minimum value "Y2421" of the Y coordinate, and the maximum value "Y2422" of the Y coordinate.

As illustrated in FIG. 21, the coordinate table 500 stores attribute information for the input fields 240 and 242. Specifically, the input fields 240 and 242 are correlated with check mark attribute information 540 for causing the user to designate (select) the input field 240 or the input field 242. In a case where the coordinate table 500 is referenced and check mark attribute information 540 is correlated with the input fields 240 and 242, the character recognition unit 170, the character recognition unit 170 recognizes that the input fields 240 and 242 for causing the user to designate (select) the check mark are present in the input screen 200. That is, data which is input by an input method using the check mark corresponds to attribute information.

The user selects the normal input mode by using the input unit 150 (keyboard 152) (No in Step S4 of FIG. 2). In this case, the normal input mode is executed (Step S6 of FIG. 2).

In the normal input mode, the user inputs characters "HATSUMEI", "TARO", "hatsumei", "taro", "2016", "1", and "1" to the input fields 210 212, 220, 222, 230, 232, and 234 of the input screen 200 displayed on the display unit 130, respectively, by using the input unit 150 (keyboard 152). The user selects (designates) the input field 240 of the input fields 240 and 242 of the input screen 200 displayed on the display unit 130 using the input unit 150 (keyboard 152). As illustrated in FIG. 24, the screen processing unit 140 displays the input screen 200, in which characters "HATSUMEI" and "TARO", characters "hatsumei" and "taro" by a full width Katakana character, and characters "2016", "1", "1" by a half width numeral, and the check mark are displayed at the input fields 210 212, 220, 222, 230, 232, 234, and 240, respectively, on the display unit 130.

Next, a handwriting input mode will be described. The screen processing unit 140 displays document data on the display unit 130 as the input screen 200 (see FIG. 20) (Step S2 of FIG. 2). Document data is data representing a document by a hypertext markup language (HTML), a portable document format (PDF), or the like.

The user selects the handwriting input mode using the input unit 150 (pointing device 154 or touch pen 156) (Yes in Step S4 of FIG. 2). In this case, the handwriting input mode is executed (Step S8 of FIG. 2).

In the handwriting input mode, the screen processing unit 140 captures the input screen 200 (see FIG. 20) displayed on the display unit 130 as a capture screen 300 (see FIG. 22), and saves the capture screen 300 in the storage unit 120 and also displays the capture screen 300 on the input screen 200 (Step S100 of FIG. 18).

As illustrated in FIG. 22, the user inputs characters "HATSUMEI", "TARO", "hatsumei", "taro", "2016", "1", and "1" to the input fields 210, 212, 220, 222, 230, 232, and 234 of the capture screen 300 by handwriting using the input unit 150 (pointing device 154 or touch pen 156). The user inputs a character "V" and the like as a check mark to the input field 240 of the input fields 240 and 242 of the capture screen 300 by handwriting using the input unit 150 (pointing device 154 or touch pen 156) (Step S102 of FIG. 18).

In this case, the user inputs characters "HATSUMEI", "TARO", "hatsumei", "taro", "2016", "1", "1", and "V" by handwriting by extending beyond the input fields 210, 212, 220, 222, 230, 232, 234, and 240 of the capture screen 300. The stroke data processing unit 160 generates coordinate columns configuring characters, which are inputted to the capture screen 300 by handwriting, as stroke data, respectively, and saves the stroke data in the storage unit 120.

The user performs a recognition instruction using the input unit 150 (pointing device 154 or touch pen 156) (Step S104 of FIG. 18).

In this case, as illustrated in FIG. 22, the stroke data processing unit 160 groups stroke data saved in the storage unit 120 into stroke data representing a character string correlated with the input fields 210 and 212, 220, 222, 230, 232, 234, and 240 and generates grouped stroke data as pieces of grouping stroke data 310, 312, 320, 322, 330, 332, 334, and 340 (Step S106 of FIG. 18).

The character recognition unit 170 conducts character recognition on pieces of grouping stroke data 310, 312, 320, 322, 330, 332, 334, and 340 and converts each of pieces of grouping stroke data 310, 312, 320, 322, 330, 332, 334, and 340 into each of the recognized characters 410, 412, 420, 422, 430, 432, 434, and 440 as characters capable of being edited by a computer (Step S108 of FIG. 18).

In this case, Katakana restriction information 520 is in correlation with the input fields 220 and 222 of the coordinate table 500 and thus, the character recognition unit 170 recognizes that the input fields 220 and 222 for causing the user to input a full width Katakana character are present in the input screen 200 to convert the recognized characters 420 and 422 into recognized characters 420 and 422 that represent a full width Katakana character. Numeric restriction information 530 is in correlation with the input fields 230, 232, and 234 of the coordinate table 500 and thus, the character recognition unit 170 recognizes that the input fields 230, 232, and 234 for causing the user to input a half width numeral are present in the input screen 200 to convert the recognized characters 430, 432, and 434 into the recognized characters 430, 432, and 434 that represent a half width numeral. Check mark attribute information 540 is in correlation with the input fields 240 and 242 of the coordinate table 500 and thus, the character recognition unit 170 recognizes that the input fields 240 and 242 for causing the user to designate (select) the check mark are present in the input screen 200 to convert the recognized characters 440 into the recognized characters 440 that represent the check mark.

In this case, as illustrated in FIG. 23, the screen processing unit 140 displays the recognized characters 410, 412, 420, 422, 430, 432, 434, and 440 on the position at which input was performed to the capture screen 300 by handwriting (Step S110 of FIG. 18). The recognized characters 410, 412, 420, 422, 430, 432, 434, and 440 represent characters "HATSUMEI" and "TARO", characters "hatsumei" and "taro" by a full width Katakana character, characters "2016", "1", and "1" by a half width numeral, and the character "V", respectively.

For example, in a case where it is determined that there is no error in at least one recognized character of the recognized characters 410, 412, 420, 422, 430, 432, 434, and 440 displayed on the capture screen 300 (No in Step S112 of FIG. 18), the user executes Step S116 which will be described later.

On the other hand, in a case where it is determined that there is an error in at least one recognized character of the recognized characters 410, 412, 420, 422, 430, 432, 434, and 440 displayed on the capture screen 300 (Yes in Step S112 of FIG. 18), the user performs correction on the at least one recognized character (Step S114 of FIG. 18). Specifically, Steps S102, S104, S106, S108, and S110 are executed for the at least one recognized character.

The user performs an input instruction using the input unit 150 (pointing device 154 or touch pen 156) (Step S116 of FIG. 18).

In a case where the coordinate table 500 is referenced and check mark attribute information 540 is not correlated with the input fields 240 and 242, the screen processing unit 140 recognizes that the input fields 240 and 242 for attaching the check mark are not present in the input screen 200 (No in Step S120 of FIG. 19). In this case, similar to the second embodiment, Step S118 is executed. That is, the screen processing unit 140 displays the input screen 200 in which the recognized characters 410, 412, 420, 422, 430, 432, and 434 are displayed at the input fields 210, 212, 220, 222, 230, 232, and 234, respectively, instead of the capture screen 300 (Step S118 of FIG. 19). Characters "HATSUMEI" and "TARO", characters "hatsumei" and "taro" by a full width Katakana character, characters "2016", "1", and "1" by a half width numeral are displayed on the input fields 210, 212, 220, 222, 230, 232, and 234 of the input screen 200, respectively.

On the other hand, in a case where the coordinate table 500 is referenced and check mark attribute information 540 is correlated with the input fields 240 and 242, the screen processing unit 140 recognizes that the input fields 240 and 242 for attaching the check mark are present in the input screen 200 (Yes in Step S120 of FIG. 19). In this case, as illustrated in FIG. 24, the screen processing unit 140 displays the input screen 200 in which the recognized characters 410, 412, 420, 422, 430, 432, and 434 and the check mark are displayed at the input fields 210, 212, 220, 222, 230, 232, 234, and 240, respectively, instead of the capture screen 300 (Step S122 of FIG. 19). That is, characters "HATSUMEI" and "TARO", characters "hatsumei" and "taro" by a full width Katakana character, characters "2016", "1", and "1" by a half width numeral are displayed on the input fields 210, 212, 220, 222, 230, 232, and 234 of the input screen 200, respectively, and also the check mark by which the input field 240 of the input fields 240 and 242 of the input screen 200 is selected (designated) is displayed in the input screen 200.

As described above, the input display device 100 according to the third embodiment includes the display unit 130 that displays the input screen 200 including the input fields 210, 212, 220, 222, 230, 232, 234, 240, and 242, the screen processing unit 140 that captures the input screen 200 displayed on the display unit 130 as the screen for handwriting input (capture screen 300) and displays the capture screen 300 on the input screen 200, the stroke data processing unit 160 that groups stroke data when input was performed on the capture screen 300 by handwriting into stroke data which represents the character strings, which are in correlation with the input fields 210, 212, 220, 222, 230, 232, 234, 240, and 242, and generates the stroke data as pieces of grouping stroke data 310, 312, 320, 322, 330, 332, 334, and 340, and the character recognition unit 170 that conducts character recognition on the pieces of grouping stroke data 310, 312, 320, 322, 330, 332, 334, and 340 and converts the pieces of grouping stroke data 310, 312, 320, 322, 330, 332, 334, and 340 into the recognized characters 410, 412, 420, 422, 430, 432, 434, and 440. In this case, the character recognition unit 170 converts the pieces of grouping stroke data 310, 312, 320, 322, 330, 332, 334, and 340 into the recognized characters 410, 412, 420, 422, 430, 432, 434, and 440 based on the input fields 210, 212, 220, 222, 230, 232, 234, 240, and 242 of the input screen 200 and the screen processing unit 140 displays the recognized characters 410, 412, 420, 422, 430, 432, 434, and 440 at the input fields 210, 212, 220, 222, 230, 232, 234, and 240 of the input screen 200, respectively. For that reason, in the input display device 100 according to the third embodiment, the user may collectively perform handwriting input without causing the user to input the character string by handwriting every time as in the technique described in Japanese Patent No. 3855696.

In the input display device 100 according to the third embodiment, attribute information (check mark attribute information 540) to be selected or designated by the user is correlated with at least two input fields 240 and 242 among the input fields 210, 212, 220, 222, 230, 232, 234, 240, and 242. The character recognition unit 170 converts pieces of grouping stroke data 310, 312, 320, 322, 330, 332, 334, and 340 into the recognized characters 410, 412, 420, 422, 430, 432, 434, and 440 based on the input fields 210, 212, 220, 222, 230, 232, 234, 240, and 242 and attribute information (check mark attribute information 540). For that reason, in the input display device 100 according to the third embodiment, for example, selection by the user (designations by the user) may be displayed at the input fields 240 and 242, as attribute information.

Here, in the input display device 100 according to the third embodiment, even in a case where pieces of grouping stroke data 310, 312, 320, 322, 330, 332, 334, and 340 are displaced with respect to the input fields 210, 212, 220, 222, 230, 232, 234, and 240 of the input screen 200, the screen processing unit 140 displays the recognized characters 410, 412, 420, 422, 430, 432, 434, and 440 obtained by conducting character recognition on the pieces of grouping stroke data 310, 312, 320, 322, 330, 332, 334, and 340 at the input fields 210, 212, 220, 222, 230, 232, 234, and 240 based on the coordinate regions of the pieces of grouping stroke data 310, 312, 320, 322, 330, 332, 334, and 340, the coordinate regions of the input fields 210, 212, 220, 222, 230, 232, 234, and 240, and attribute information (check mark attribute information 540). For example, a portion of the coordinate regions of pieces of grouping stroke data 340 among the pieces of grouping stroke data 310, 312, 320, 322, 330, 332, 334, and 340 overlaps the coordinate regions of the input field 240 among the input fields 210, 212, 220, 222, 230, 232, 234, and 240, but a portion of the coordinate regions of a piece of grouping stroke data 340 among the pieces of grouping stroke data 310, 312, 320, 322, 330, 332, 334, and 340 is extended beyond the coordinate regions of the input field 240 among the input fields 210, 212, 220, 222, 230, 232, 234, and 240. Also, in this case, the recognized characters 440 obtained by conducting character recognition on the piece of grouping stroke data 340 may be displayed at the input field 240 based on the coordinate regions and attribute information (check mark attribute information 540).

Fourth Embodiment

In the fourth embodiment, characters (for example, signature of a user) which are input to a portion other than respective input fields in the capture screen 300 by handwriting may be displayed on the input screen 200.

The operations of the input display device 100 according to the fourth embodiment will be described using FIGS. 18 to 21 and FIGS. 25 to 27. FIGS. 25 to 27 are diagrams for explaining the operations of the input display device 100 according to the fourth embodiment.

In the handwriting input mode, the screen processing unit 140 captures the input screen 200 (see FIG. 20) displayed on the display unit 130 as a capture screen 300 (see FIG. 25) and saves the capture screen 300 in the storage unit 120, and also displays the capture screen 300 on the input screen 200 (Step S100 of FIG. 18).

As illustrated in FIG. 25, the user inputs characters "HATSUMEI", "TARO", "hatsumei", "taro", "2016", "1", and "1" to the input fields 210, 212, 220, 222, 230, 232, and 234 of the capture screen 300 by handwriting using the input unit 150 (pointing device 154 or touch pen 156). The user inputs a character "V" and the like as a check mark to the input field 240 of the input fields 240 and 242 of the capture screen 300 by handwriting using the input unit 150 (pointing device 154 or touch pen 156). The user inputs a character obtained by encircling a character "HATSU", as a signature of the user, in a portion other than the input fields 210 and 212, 220, 222, 230, 232, 234, 240, and 242 of the capture screen 300 (Step S102 of FIG. 18).

In this case, the user inputs characters "HATSUMEI", "TARO", "hatsumei", "taro", "2016", "1", "1", and "V" by handwriting by extending beyond the input fields 210, 212, 220, 222, 230, 232, 234, and 240 of the capture screen 300. The user also inputs the character obtained by encircling a character "HATSU" to a right corner part of the capture screen 300 by handwriting. The stroke data processing unit 160 generates coordinate columns configuring characters, which are inputted to the capture screen 300 by handwriting, as stroke data, respectively, and saves the stroke data in the storage unit 120.

The user performs a recognition instruction using the input unit 150 (pointing device 154 or touch pen 156) (Step S104 of FIG. 18).

In this case, as illustrated in FIG. 25, the stroke data processing unit 160 generates stroke data representing character strings, which are correlated with the input fields 210, 212, 220, 222, 230, 232, 234, and 240 among stroke data saved in the storage unit 120, as pieces of grouping stroke data 310, 312, 320, 322, 330, 332, 334, and 340. The stroke data processing unit 160 generates stroke data representing character strings, which are not correlated with the input fields 210 and 212, 220, 222, 230, 232, 234, and 240 among stroke data saved in the storage unit 120, as a handwritten character 350 (Step S106 of FIG. 18).

The character recognition unit 170 conducts character recognition on pieces of grouping stroke data 310, 312, 320, 322, 330, 332, 334, and 340 and converts each of pieces of grouping stroke data 310, 312, 320, 322, 330, 332, 334, and 340 into each of the recognized characters 410, 412, 420, 422, 430, 432, 434, and 440 as characters capable of being edited by a computer (Step S108 of FIG. 18).

In this case, Katakana restriction information 520 is in correlation with the input fields 220 and 222 of the coordinate table 500 and thus, the character recognition unit 170 recognizes that the input fields 220 and 222 for causing the user to input a full width Katakana character are present in the input screen 200 to convert the recognized characters 420 and 422 into the recognized characters 420 and 422 that represent a full width Katakana character. Numeric restriction information 530 is in correlation with the input fields 230, 232, and 234 of the coordinate table 500 and thus, the character recognition unit 170 recognizes that the input fields 230, 232, and 234 for causing the user to input a half width numeral are present in the input screen 200 to convert the recognized characters 430, 432, and 434 into the recognized characters 430, 432, and 434 that represent a half width numeral. Check mark attribute information 540 is in correlation with the input fields 240 and 242 of the coordinate table 500 and thus, the character recognition unit 170 recognizes that the input fields 240 and 242 for causing the user to designate (select) the check mark are present in the input screen 200 to convert the recognized character 440 into the recognized character 440 that represents the check mark.

In this case, as illustrated in FIG. 26, the screen processing unit 140 displays the recognized characters 410, 412, 420, 422, 430, 432, 434, and 440 and the handwritten character 350 on the position at which input was performed to the capture screen 300 by handwriting (Step S110 of FIG. 18). The recognized characters 410, 412, 420, 422, 430, 432, 434, and 440 represent characters "HATSUMEI" and "TARO", characters "hatsumei" and "taro" by a full width Katakana character, characters "2016", "1", and "1" by a half width numeral, and the character "V", respectively.

For example, in a case where it is determined that there is no error in at least one recognized character of the recognized characters 410, 412, 420, 422, 430, 432, 434, and 440 displayed on the capture screen 300 (No in Step S112 of FIG. 18), the user executes Step S116 which will be described later.

On the other hand, in a case where it is determined that there is an error in at least one recognized character of the recognized characters 410, 412, 420, 422, 430, 432, 434, and 440 displayed on the capture screen 300 (Yes in Step S112 of FIG. 18), the user performs correction on the at least one recognized character (Step S114 of FIG. 18). Specifically, Steps S102, S104, S106, S108, and S110 are executed for the at least one recognized character.

The user performs an input instruction using the input unit 150 (pointing device 154 or touch pen 156) (Step S116 of FIG. 18).

In a case where the coordinate table 500 is referenced and check mark attribute information 540 is not correlated with the input fields 240 and 242, the screen processing unit 140 recognizes that the input fields 240 and 242 for attaching the check mark are not present in the input screen 200 (No in Step S120 of FIG. 19). In this case, Step S118 is executed. That is, the screen processing unit 140 displays the input screen 200 in which the recognized characters 410, 412, 420, 422, 430, 432, and 434 are displayed at the input fields 210, 212, 220, 222, 230, 232, and 234, respectively, and the handwritten character 350 is displayed at the portion other than the input fields 210, 212, 220, 222, 230, 232, and 234, instead of the capture screen 300 (Step S118 of FIG. 19). Characters "HATSUMEI" and "TARO", characters "hatsumei" and "taro" by a full width Katakana character, and characters "2016", "1", and "1" by a half width numeral are displayed on the input fields 210, 212, 220, 222, 230, 232, and 234 of the input screen 200, respectively. The encircled character "HATSU" is displayed on a right corner part of the input screen 200.

On the other hand, in a case where the coordinate table 500 is referenced and check mark attribute information 540 is correlated with the input fields 240 and 242, the screen processing unit 140 recognizes that the input fields 240 and 242 for attaching the check mark are present in the input screen 200 (Yes in Step S120 of FIG. 19). In this case, as illustrated in FIG. 27, the screen processing unit 140 displays the input screen 200 in which the recognized characters 410, 412, 420, 422, 430, 432, and 434 and the check mark are displayed at the input fields 210, 212, 220, 222, 230, 232, and 234, respectively, and the handwritten character 350 is displayed at the portion other than the input fields 210, 212, 220, 222, 230, 232, and 234, instead of the capture screen 300 (Step S122 of FIG. 19). That is, characters "HATSUMEI" and "TARO", characters "hatsumei" and "taro" by a full width Katakana character, characters "2016", "1", and "1" by a half width numeral are displayed on the input fields 210, 212, 220, 222, 230, 232, 234, and 240 of the input screen 200, respectively, and also the check mark by which the input field 240 of the input fields 240 and 242 of the input screen 200 is selected (designated) is displayed on the input screen 200. The encircled character "HATSU" is displayed on the right corner part of the input screen 200.

As described above, the input display device 100 according to the fourth embodiment includes the display unit 130 that displays the input screen 200 including the input fields 210, 212, 220, 222, 230, 232, 234, 240, and 242, the screen processing unit 140 that captures the input screen 200 displayed on the display unit 130 as the screen for handwriting input (capture screen 300) and displays the capture screen 300 on the input screen 200, the stroke data processing unit 160 that groups stroke data when input was performed on the capture screen 300 by handwriting into stroke data which represents the character string, which are in correlation with the input fields 210, 212, 220, 222, 230, 232, 234, 240, and 242, and generates the stroke data as pieces of grouping stroke data 310, 312, 320, 322, 330, 332, 334, and 340, and the character recognition unit 170 that conducts character recognition on the pieces of grouping stroke data 310, 312, 320, 322, 330, 332, 334, and 340 and converts the pieces of grouping stroke data 310, 312, 320, 322, 330, 332, 334, and 340 into the recognized characters 410, 412, 420, 422, 430, 432, 434, and 440. The screen processing unit 140 displays the recognized characters 410, 412, 420, 422, 430, 432, 434, and 440 at the input fields 210, 212, 220, 222, 230, 232, 234, and 240 of the input screen 200. For that reason, in the input display device 100 according to the fourth embodiment, the user may collectively perform handwriting input without causing the user to input the character string by handwriting every time as in the technique described in Japanese Patent No. 3855696.

In the input display device 100 according to the fourth embodiment, the stroke data processing unit 160 generates stroke data representing character strings that are not correlated with the input fields 210, 212, 220, 222, 230, 232, and 234 as the handwritten character 350. The screen processing unit 140 displays the handwritten character 350 and the recognized characters 410, 412, 420, 422, 430, 432, and 434 displayed at the input fields 210, 212, 220, 222, 230, 232, and 234 on the input screen 200. For that reason, in the input display device 100 according to the fourth embodiment, the character (for example, signature of a user), which is input to a portion other than respective input field in the capture screen 300 by handwriting, may be displayed on the input screen 200.

Fifth Embodiment

In the second embodiment, although the input screen 200 includes, for example, an input field for receiving a full width Katakana character or an input field for receiving a half width numeral as restriction information that restricts a type of a character, the restriction information is not limited to the input fields. The input screen 200 may include, for example, an input field for receiving a half width alphabet as restriction information that restricts a type of a character, instead of the input field for receiving a full width Katakana character.

Sixth Embodiment

In the first to fifth embodiments, the input screen 200 has the coordinates (X0, Y0), (Xmax, Y0), (X0, Ymax), and (Xmax, Ymax), but is not limited thereto. For example, the input screen 200 (window) is movable on the display unit 130, and in a case where the input screen 200 does not have coordinates on the display unit 130, when the user performs handwriting input on the capture screen 300, the screen processing unit 140 may correlate the coordinates on the display unit 130 with the input screen 200 by regarding the coordinates on the capture screen 300 as event data.

Seventh Embodiment

As a seventh embodiment, a case where inputted characters (character string) are alphanumeric characters will be described. FIG. 28 is a diagram in which alphanumeric characters are input to a capture screen 400 and the alphanumeric characters are displayed on an input screen. It is assumed that a functional configuration and basic processing of the seventh embodiment are identical to the above-described embodiments, and specific processing may be made by suitably referencing the above-described embodiments. Accordingly, description will be made mainly on portions different from those of the above-described embodiments in the seventh embodiment.

FIG. 28 illustrates the capture screen 400 in the handwriting input mode. The capture screen 400 is obtained by capturing an input screen and input fields denoted as "First name", "Last name", and "Date of Birth" are present in the input screen. A field of "Title" is also present as a selectable selection button.

Here, the user inputs characters "John", "Smith", and "Aug. 29, 1970" to the input field of the capture screen 400 by handwriting using the input unit 150. The user inputs a check mark to the selection button by handwriting. Coordinate columns that constitute the characters (character string) input by handwriting are respectively generated as pieces of stroke data and pieces of generated stroke data are saved in the storage unit 120.

In this case, the pieces of stroke data that represent a character string correlated with the input field may be generated as grouping stroke data. Character recognition is conducted on the pieces of stroke data (grouping stroke data) and each of the pieces of stroke data is converted into each of the recognized characters as characters (character string) capable of being edited by a computer.

Here, the character recognition unit 170 converts each of the pieces of stroke data into the at least one recognized character by correlating the piece of stroke data with the input field. Specifically, if the input field is the "First name" field, the character recognition unit 170 performs character recognition of an alphanumeric character. Regarding the selection button, the character recognition unit 170 recognizes the check mark as the recognized character to be recognized.

Although the character recognition unit 170 converts stroke data into the at least one recognized character correlated with the input field, stroke data may be recognized in a predetermined language. The predetermined language may be set as the "English language", "Japanese language", "Arabic", and the like before corresponding processing is executed and the language which is set in the OS may be used.

FIG. 29 is the capture screen 400 indicating a state in which characters and a character string are recognized. When the recognition is suitable, an operation for displaying is executed by the user and the at least one recognized character and character string are input to each input field. That is, the at least one recognized character is displayed at the plurality of input field of the input screen.

Eighth Embodiment

An eighth embodiment will be described. In the fourth embodiment, handwriting input and other input in the Japanese language was described. The eighth embodiment has a form of classifying whether characters are to be recognized according to attribute information of a field to be used for receiving or whether stroke data is to be stored as it is. It is assumed that a functional configuration and basic processing of the eighth embodiment are identical to the above-described embodiments, and specific processing may be made by suitably referencing the above-described embodiments.

Accordingly, description will be made mainly on portions different from those of the above-described embodiments in the eighth embodiment.

Figure 30:
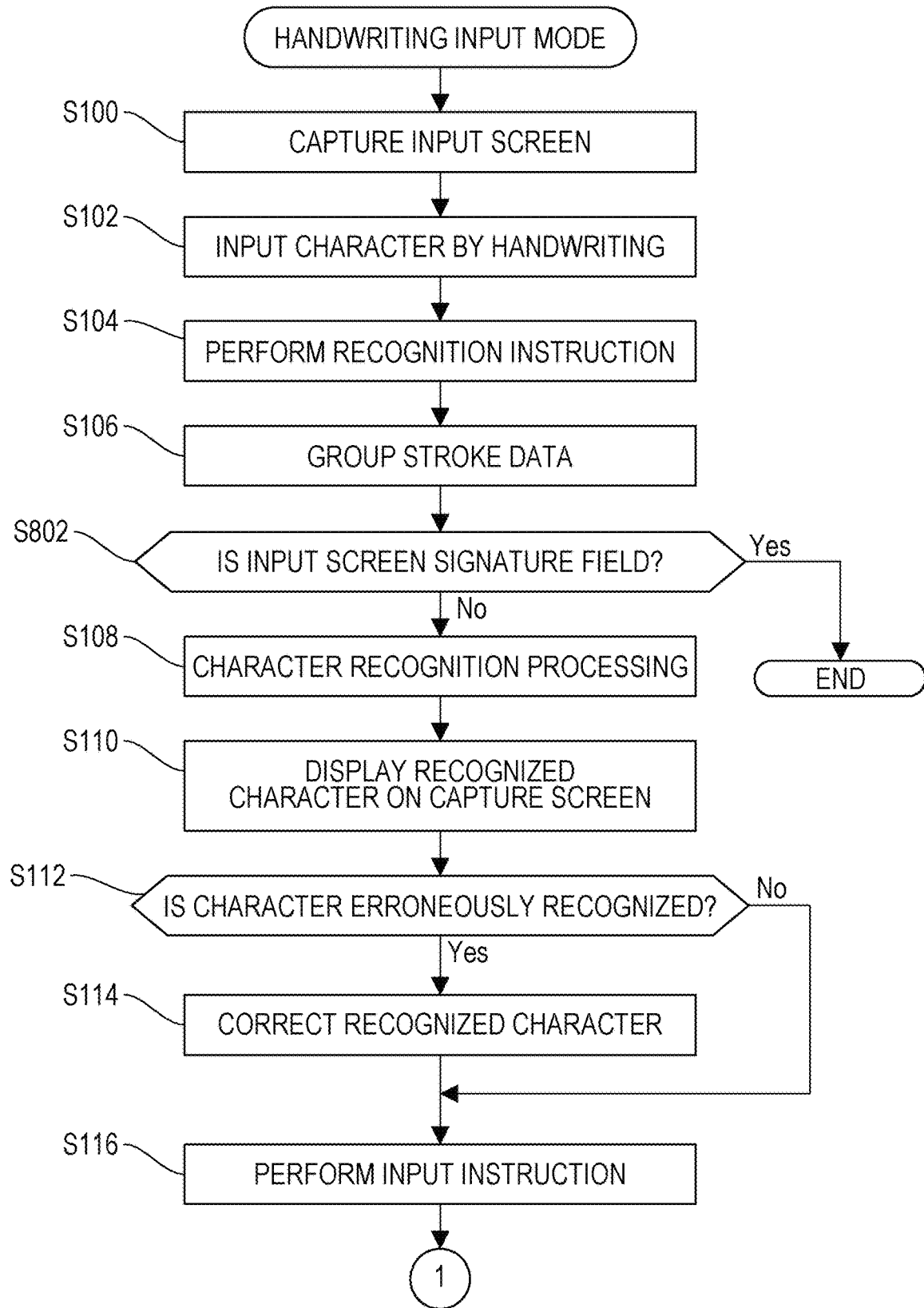
FIG. 30 is a diagram for explaining an operation of an input display device according to an eighth embodiment.

FIG. 30 is a flowchart obtained by replacing processing of FIG. 18 in the third embodiment. The same processing flow as that of FIG. 18 is assigned the same reference numerals and description thereof will be omitted. That is, Step S802 is added in FIG. 30.

In Step S802, it is determined whether attribute information of a position of the input screen to which current stroke data is input is the signature field or not (Step S802). Here, although in a case where attribute information is not the signature field (No in Step S802), processing is executed from Step S108 similar to other embodiments, in a case where attribute information is the signature field (Yes in Step S802), character recognition is not performed. That is, stroke data is displayed on the input screen as a signature which is input by handwriting.

Attribute information which is the signature may be stored in, for example, the coordinate table 500 by being correlated with the signature. For example, information "signature attribute information signature field" is stored for a content "signature field".

FIG. 31 is a capture screen 510 based on the input screen in the eighth embodiment. In the capture screen 510, input fields are present, grouping stroke data 600 is input to, for example, the input field of "First name", and is recognized as the recognized characters 610, as illustrated in FIG. 32.

Here, handwritten characters 602 which are input to the signature field is generated, as handwritten characters 612 as they are, based on an attribute of the signature field and is displayed.

As such, according to the eighth embodiment, the characters (stroke data) which are input to a normal input field by handwriting are generated as grouping stroke data and are recognized as a character string. The signature input to the signature field is generated and recognized as the handwritten characters as they are.

In the eighth embodiment, although the signature field is described as an example, description made for the signature field may be applied to other fields (for example, a graphic input field and a check field) and a plurality of fields may be provided.

Ninth Embodiment

A ninth embodiment will be described. In the eighth embodiment, determination as to whether character recognition is to be performed or not was performed based on the field to be used for receiving. In the ninth embodiment, description will be made on a case where an attribute of the field to be for receiving is determined by further using additional coordinate information. It is assumed that a functional configuration and basic processing of the ninth embodiment are identical to the above-described embodiments, and specific processing may be made by suitably referencing the above-described embodiments. Accordingly, description will be made mainly on portions different from those of the above-described embodiments in the ninth embodiment.

Figure 33:
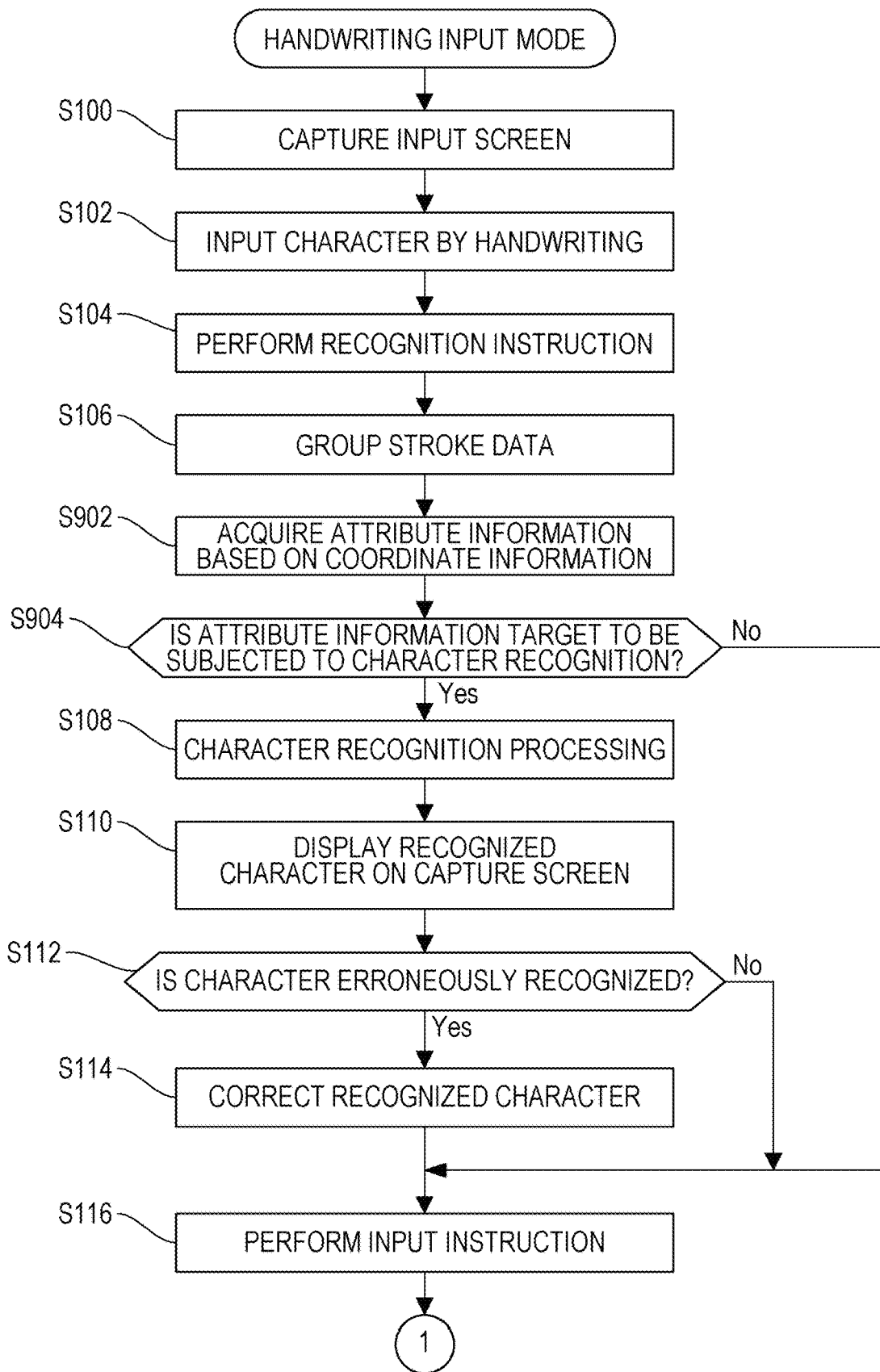
FIG. 33 is a diagram for explaining an operation of an input display device according to a ninth embodiment.

FIG. 33 is a flowchart obtained by replacing processing of FIG. 30 (FIG. 18) in the eighth embodiment (third embodiment). The same processing flow as that of FIG. 30 (FIG. 18) is assigned the same reference numerals and description thereof will be omitted. That is, Steps S902 and S904 are added in FIG. 33 in comparison with the operational flow of FIG. 18.

In the capture screen, when handwriting input is performed, attribute information is acquired based on coordinate information which is input by handwriting (Step S902). Here, when acquired attribute information is a target to be subjected to character recognition, processing is executed from Step S108 (Yes in Step S904). That is, character recognition is executed.

In contrast, when acquired attribute information is not present in the target to be subjected to character recognition, character recognition is not performed (No in Step S904). Correlations of pieces of coordinate information and attribute information may be stored in, for example, the coordinate table 500.

Figure 34:
FIG. 34 is a diagram for explaining the operation of the input display device according to the ninth embodiment.

For example, FIG. 34 is a capture screen (input screen) based on the input screen in which an input frame is not displayed. In this case, an input region 750 is a region for which character recognition is not performed and an input region 760 is a region for which character recognition is performed. That is, matters, which indicate a region for which character recognition is to be performed or not, are set in attribute information of coordinate information including the input region.

Accordingly, character recognition is performed on grouping stroke data 700. For example, character recognition is performed on grouping stroke data 700 is subjected to character recognition and is displayed as the recognized characters 710 of FIG. 35.

Handwritten characters 702 which are input to the region for which character recognition is not performed are input as the handwritten characters as they are. That is, grouping stroke data 700 is displayed as the handwritten characters 712 in FIG. 35.

As such, according to the ninth embodiment, even in a case where the input frame is not displayed, attribute information is suitably acquired and the input stroke data is input as characters (character string), handwritten characters, or graphic according to attribute information.

Contents described in the seventh embodiment to the ninth embodiment are also sufficiently described in the contents described in the first embodiment to the sixth embodiment. In the first embodiment to the sixth embodiment, as the embodiments, although description was made mainly on characters such as Chinese characters and Katakana characters, matters that the description is also applied to alphanumeric characters are described for confirmation. For example, also in FIG. 15, a numeral is recognized and thus, matters described in FIG. 15 may be a range which is enough for a person skilled in the art to understand.

Although an example of the alphanumeric character was described in the seventh embodiment to the ninth embodiment, it is needless to say that other characters (for example, Arabic characters, Cyrillic characters, Thai characters) and symbols are also similarly applied.

MODIFICATION EXAMPLE

As described above, the disclosure is not limited to the above-described embodiments and may be various modifications may be made thereto. That is, embodiments capable of being obtained by combining suitably modified technical units may also fall within a technical range of the disclosure.

The present disclosure contains subject matter related to that disclosed in Japanese Priority Patent Application JP 2016-89589 filed in the Japan Patent Office on Apr. 27, 2016 and Japanese Priority Patent Application JP 2017-44279 filed in the Japan Patent Office on Mar. 8, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An input display device comprising:
   a display that displays a screen for handwriting input on an input screen including a plurality of input fields;
   a stroke data generator that groups stroke data which is input to the screen for handwriting input by handwriting to generate grouped stroke data as grouping stroke data;
   a character recognition processor that conducts character recognition on the grouping stroke data to convert the grouping stroke data into a recognized character; and
   an image processor that displays the recognized character at the plurality of input fields, wherein
   when there are a plurality of input fields corresponding to the recognized character, the image processor selects an input field corresponding to the recognized character among the plurality of input fields based on a position a region of the recognized character and positions of regions of the plurality of input fields, and displays the recognized character on a selected input field.

2. The input display device according to claim 1, wherein the image processor displays the recognized characters at the plurality of input fields simultaneously when there are a plurality of grouping stroke data.

3. The input display device according to claim 1, wherein the image processor displays the recognized character in the input field corresponding to the recognized character according to an input instruction by a user, after conducting character recognition on the grouping stroke data and displaying the recognition character at a handwritten position.

4. The input display device according to claim 1, wherein with at least one of the plurality of input fields that is attribute information associated, the character recognition processor:
   determines whether the character recognition is to be conducted on the grouping stroke data of the input field or not based on the attribute information of the input field,
   conducts character recognition on the grouping stroke data corresponding to the input field, and converts the grouping stroke data into the at least one recognized character, when it is determined that the character recognition is to be conducted on the grouping stroke data of the input field, and
   when it is determined that the character recognition is not to be conducted on the grouping stroke data of the input field, the image processor generates the grouping stroke data as handwritten characters without conducting character recognition on the grouping stroke data, and displays the handwritten characters in the input field.

5. The input display device according to claim 4, wherein the attribute information includes restriction information based on a character type of the input field, restriction information based on an input method selected or designated by a user, and/or information which indicates a signature field to be input by handwriting.

6. The input display device according to claim 1, wherein the character recognition processor acquires the attribute information based on a position information of handwriting input, and conducts character recognition when an acquired attribute information is information to be subjected to the character recognition.

7. The input display device according to claim 1, wherein the input screen for handwriting input is a capture screen, when coordinates are not provided for the input screen, the image processor associates the coordinates on the capture screen with the input screen as event data according to handwritten input on the capture screen.

8. The input display device according to claim 1, wherein
   the input display device further includes a determiner to determine whether a first coordinate area detected for the stroke data overlaps with a second coordinate area of the input field of the input screen,
   when the first coordinate area overlaps with the second coordinate area, the image processor changes a character size of the recognized character to a character size based on the second coordinate area, and displays the recognized character on the input field.

9. An input display method of an input display device including an input screen, the input display method comprising:
   displaying a screen for handwriting input on an input screen including a plurality of input fields;
   grouping stroke data which is input to the screen for handwriting input by handwriting to generate grouped stroke data as grouping stroke data;
   conducting character recognition on the grouping stroke data to convert the grouping stroke data into a recognized character; and
   displaying the recognized character at the plurality of input fields, wherein
   when there are a plurality of input fields corresponding to the recognized character in the displaying the recognized character, an input field corresponding to the recognized character among the plurality of input fields is selected based on a position a region of the recognized character and positions of regions of the plurality of input fields, and the recognized character is displayed on a selected input field.

10. A non-transitory recording medium storing a program that causes a computer mounted on an input display device to execute a process comprising:
    displaying a screen for handwriting input on an input screen including a plurality of input fields;
    grouping stroke data which is input to the screen for handwriting input by handwriting to generate grouped stroke data as grouping stroke data;
    conducting character recognition on the grouping stroke data to convert the grouping stroke data into a recognized character; and
    displaying the recognized character at the input fields, wherein
    when there are a plurality of input fields corresponding to the recognized character in the displaying the recognized character, an input field corresponding to the recognized character among the plurality of input fields is selected based on a position a region of the recognized character and positions of regions of the plurality of input fields, and the recognized character is displayed on a selected input field.

* * * * *